(12) United States Patent
Ensworth et al.

(10) Patent No.: US 12,207,599 B2
(45) Date of Patent: Jan. 28, 2025

(54) EMITTER COUPLER AND IRRIGATION SYSTEM

(71) Applicant: Rain Bird Corporation, Azusa, CA (US)

(72) Inventors: Mark Murphy Ensworth, Orange, CA (US); Kenny Cuong Phong, Chino Hills, CA (US)

(73) Assignee: RAIN BIRD CORPORATION, Azusa, CA (US)

( * ) Notice: Subject to any disclaimer, the term of this patent is extended or adjusted under 35 U.S.C. 154(b) by 331 days.

(21) Appl. No.: 17/499,559

(22) Filed: Oct. 12, 2021

(65) Prior Publication Data

US 2023/0113830 A1 Apr. 13, 2023

(51) Int. Cl.
A01G 25/02 (2006.01)
F16L 33/16 (2006.01)

(52) U.S. Cl.
CPC ............ *A01G 25/023* (2013.01); *F16L 33/16* (2013.01)

(58) Field of Classification Search
CPC ..... A01G 25/02; A01G 25/023; A01G 25/026
USPC ................................. 239/266–269, 542, 547
See application file for complete search history.

(56) References Cited

U.S. PATENT DOCUMENTS

| | | |
|---|---|---|
| 1,329,559 A | 2/1920 | Tesla |
| 2,148,419 A | 2/1939 | Parker |
| 2,174,515 A | 10/1939 | Hughes |
| 2,449,731 A | 9/1948 | Therrien |
| 2,508,403 A | 5/1950 | Knauss |
| 2,598,961 A | 6/1952 | Andrus |
| 2,625,429 A | 1/1953 | Coles |
| 2,639,194 A | 5/1953 | Wahlin |
| 2,683,061 A | 7/1954 | Tuttle, Jr. |
| 2,762,397 A | 9/1956 | Miller |

(Continued)

FOREIGN PATENT DOCUMENTS

| | | |
|---|---|---|
| AU | 511876 | 10/1978 |
| AU | 2004208646 | 3/2006 |

(Continued)

OTHER PUBLICATIONS

Alam, M., et al., "Subsurface Drip Irrigation for Alfalfa," Kansas State University, 2009, pp. 1-8.

(Continued)

*Primary Examiner* — Steven J Ganey
(74) *Attorney, Agent, or Firm* — FITCH, EVEN, TABIN & FLANNERY LLP

(57) ABSTRACT

An emitter coupler is provided, such as for use in an irrigation dripline. The emitter coupler includes a body with two portions for coupling to two supply tubes. The emitter coupler also includes a conduit defined by the body that receives fluid from a supply tube. The emitter coupler also has an emitter including: an emitter inlet that receives fluid from the conduit; an emitter outlet downstream of the emitter inlet with the inlet receiving fluid at a certain pressure and the outlet emitting fluid at a reduced pressure; and a pressure reducing flow channel disposed in the emitter between the inlet and the outlet. The emitter coupler further includes a housing that encloses the emitter. The housing is (Continued)

in fluid communication with the conduit and defines an outlet of the emitter coupler. A dripline with at least one emitter coupler is also provided.

21 Claims, 12 Drawing Sheets

(56) References Cited

U.S. PATENT DOCUMENTS

| | | | |
|---|---|---|---|
| 2,794,321 A | 6/1957 | Warner | |
| 2,873,030 A | 2/1959 | Ashton | |
| 2,970,923 A | 2/1961 | Sparmann | |
| 3,004,330 A | 10/1961 | Wilkins | |
| 3,155,612 A | 11/1964 | Weber | |
| 3,182,916 A | 5/1965 | Schulz | |
| 3,199,791 A | 8/1965 | Chapin | |
| 3,199,901 A | 8/1965 | Jeppsson | |
| 3,256,693 A | 6/1966 | Mathis | |
| 3,302,450 A | 2/1967 | Wakar | |
| 3,323,550 A | 6/1967 | Lee, II | |
| 3,361,359 A | 1/1968 | Chapin | |
| 3,361,363 A | 1/1968 | Babington | |
| 3,420,064 A | 1/1969 | Blass | |
| 3,426,544 A | 2/1969 | Curtis | |
| 3,434,500 A | 3/1969 | Burrows | |
| 3,467,142 A | 9/1969 | Boyle | |
| 3,586,239 A * | 6/1971 | Blass | A01G 25/023 239/542 |
| 3,586,291 A | 6/1971 | Malec | |
| 3,667,685 A * | 6/1972 | Rinkewich | A01G 25/023 239/542 |
| 3,672,571 A | 6/1972 | Goodricke | |
| 3,693,888 A | 9/1972 | Rondas | |
| 3,697,002 A | 10/1972 | Parkison | |
| 3,698,195 A | 10/1972 | Chapin | |
| 3,719,327 A | 3/1973 | McMahan | |
| 3,727,635 A | 4/1973 | Todd | |
| 3,729,142 A | 4/1973 | Rangel-Garza | |
| 3,753,527 A | 8/1973 | Galbraith | |
| 3,777,980 A | 12/1973 | Allport | |
| 3,777,987 A | 12/1973 | Allport | |
| 3,779,468 A | 12/1973 | Spencer | |
| 3,780,946 A | 12/1973 | Smith | |
| 3,791,587 A | 2/1974 | Drori | |
| 3,792,588 A | 2/1974 | Gilaad | |
| 3,797,741 A | 3/1974 | Spencer | |
| 3,804,334 A | 4/1974 | Curry | |
| 3,806,031 A | 4/1974 | Olson | |
| 3,806,036 A | 4/1974 | Olson | |
| 3,807,430 A | 4/1974 | Keller | |
| 3,814,377 A | 6/1974 | Todd | |
| 3,815,636 A | 6/1974 | Menzel | |
| RE28,095 E | 7/1974 | Chapin | |
| 3,830,067 A | 8/1974 | Osborn | |
| 3,833,019 A | 9/1974 | Diggs | |
| 3,849,639 A | 11/1974 | Brock | |
| 3,851,896 A | 12/1974 | Olson | |
| 3,856,333 A | 12/1974 | Cox | |
| 3,863,845 A | 2/1975 | Bumpstead | |
| 3,866,833 A | 2/1975 | Shibata | |
| 3,870,236 A | 3/1975 | Sahagun-Barragan | |
| 3,873,030 A | 3/1975 | Barragan | |
| 3,874,598 A | 4/1975 | Havens | |
| 3,882,892 A | 5/1975 | Menzel | |
| 3,885,743 A | 5/1975 | Wake | |
| 3,895,085 A | 7/1975 | Suzuki | |
| 3,896,999 A | 7/1975 | Barragan | |
| 3,897,009 A | 7/1975 | Rangel-Garza | |
| 3,903,929 A | 9/1975 | Mock | |
| 3,929,258 A | 12/1975 | Stephens | |
| 3,939,875 A | 2/1976 | Osborn | |
| 3,940,066 A | 2/1976 | Hunter | |
| 3,948,285 A | 4/1976 | Flynn | |
| 3,954,223 A | 5/1976 | Wichman | |
| 3,957,292 A | 5/1976 | Diggs | |
| 3,966,233 A | 6/1976 | Diggs | |
| 3,968,930 A * | 7/1976 | Hendrickson | A01G 25/023 239/542 |
| 3,970,251 A | 7/1976 | Harmony | |
| 3,973,732 A | 8/1976 | Diggs | |
| 3,981,452 A | 9/1976 | Eckstein | |
| 3,993,248 A | 11/1976 | Harmony | |
| 3,995,436 A | 12/1976 | Diggs | |
| 3,998,244 A | 12/1976 | Bentley | |
| 3,998,391 A | 12/1976 | Lemelshtrich | |
| 3,998,427 A | 12/1976 | Bentley | |
| 4,008,853 A | 2/1977 | Tregillus | |
| 4,017,958 A | 4/1977 | Diggs | |
| 4,022,384 A | 5/1977 | Hoyle | |
| 4,036,435 A | 7/1977 | Pecaro | |
| 4,037,791 A | 7/1977 | Mullett | |
| 4,047,995 A | 9/1977 | Leal-Diaz | |
| 4,054,152 A | 10/1977 | Ito | |
| 4,058,257 A | 11/1977 | Spencer | |
| 4,059,228 A | 11/1977 | Werner | |
| 4,065,926 A | 1/1978 | Brandt | |
| 4,077,570 A | 3/1978 | Harmony | |
| 4,077,571 A | 3/1978 | Harmony | |
| 4,084,749 A | 4/1978 | Drori | |
| 4,092,002 A | 5/1978 | Grosse | |
| 4,095,750 A | 6/1978 | Gilead | |
| 4,100,940 A | 7/1978 | Spears | |
| 4,105,162 A | 8/1978 | Drori | |
| 4,121,771 A | 10/1978 | Hendrickson | |
| 4,122,590 A | 10/1978 | Spencer | |
| 4,128,918 A | 12/1978 | Wenk | |
| 4,132,364 A | 1/1979 | Harmony | |
| 4,134,550 A | 1/1979 | Bright | |
| 4,143,820 A | 3/1979 | Bright | |
| 4,147,307 A | 4/1979 | Christy | |
| 4,160,323 A | 7/1979 | Tracy | |
| 4,161,291 A | 7/1979 | Bentley | |
| 4,177,946 A | 12/1979 | Sahagun-Barragan | |
| 4,177,947 A | 12/1979 | Menzel | |
| 4,196,753 A | 4/1980 | Hammarstedt | |
| 4,196,853 A | 4/1980 | Delmer | |
| 4,209,133 A | 6/1980 | Mehoudar | |
| 4,210,287 A | 7/1980 | Mehoudar | |
| 4,215,822 A | 8/1980 | Mehoudar | |
| 4,223,838 A | 9/1980 | Maria-Vittorio-Torrisi | |
| 4,225,307 A | 9/1980 | Magera | |
| 4,226,368 A | 10/1980 | Hunter | |
| 4,235,380 A | 11/1980 | Delmer | |
| 4,247,051 A | 1/1981 | Allport | |
| 4,250,915 A | 2/1981 | Rikuta | |
| 4,273,286 A | 6/1981 | Menzel | |
| 4,274,597 A | 6/1981 | Dobos | |
| 4,281,798 A | 8/1981 | Lemelstrich | |
| 4,307,841 A | 12/1981 | Mehoudar | |
| 4,317,539 A | 3/1982 | Pollock | |
| 4,331,293 A | 5/1982 | Rangel-Garza | |
| 4,344,576 A | 8/1982 | Smith | |
| 4,354,639 A | 10/1982 | Delmer | |
| 4,366,926 A | 1/1983 | Mehoudar | |
| 4,369,923 A | 1/1983 | Bron | |
| 4,384,680 A | 5/1983 | Mehoudar | |
| 4,385,727 A | 5/1983 | Spencer | |
| 4,385,757 A | 5/1983 | Muller | |
| 4,392,616 A | 7/1983 | Olson | |
| 4,413,786 A | 11/1983 | Mehoudar | |
| 4,413,787 A | 11/1983 | Gilead | |
| 4,423,838 A | 1/1984 | Dinur | |
| 4,424,936 A | 1/1984 | Marc | |
| 4,430,020 A | 2/1984 | Robbins | |
| 4,460,129 A | 7/1984 | Olson | |
| 4,473,191 A | 9/1984 | Chapin | |
| 4,473,525 A | 9/1984 | Drori | |
| 4,502,631 A | 3/1985 | Christen | |
| 4,508,140 A | 4/1985 | Harrison | |
| 4,513,777 A | 4/1985 | Wright | |
| 4,519,546 A | 5/1985 | Gorney | |
| 4,522,339 A | 6/1985 | Costa | |
| 4,533,083 A | 8/1985 | Tucker | |

(56) References Cited

U.S. PATENT DOCUMENTS

| | | |
|---|---|---|
| 4,534,515 A | 8/1985 | Chapin |
| 4,545,784 A | 10/1985 | Sanderson |
| 4,550,878 A | 11/1985 | Rosenberg |
| 4,572,756 A | 2/1986 | Chapin |
| 4,573,640 A | 3/1986 | Mehoudar |
| D284,222 S | 6/1986 | Hamilton |
| 4,593,857 A | 6/1986 | Raz |
| 4,613,080 A | 9/1986 | Benson |
| 4,626,130 A | 12/1986 | Chapin |
| 4,627,903 A | 12/1986 | Chapman |
| 4,642,152 A | 2/1987 | Chapin |
| 4,653,695 A | 3/1987 | Eckstein |
| 4,687,143 A | 8/1987 | Gorney |
| 4,702,787 A | 10/1987 | Ruskin |
| 4,718,608 A | 1/1988 | Mehoudar |
| 4,722,481 A | 2/1988 | Lemkin |
| 4,722,759 A | 2/1988 | Roberts |
| 4,726,520 A | 2/1988 | Brown |
| 4,726,527 A | 2/1988 | Mendenhall |
| 4,728,042 A | 3/1988 | Gorney |
| 4,735,363 A | 4/1988 | Shfaram |
| 4,749,130 A | 6/1988 | Utzinger |
| 4,753,394 A | 6/1988 | Goodman |
| 4,756,339 A | 7/1988 | Buluschek |
| 4,765,541 A | 8/1988 | Mangels |
| 4,775,046 A | 10/1988 | Gramarossa |
| 4,781,217 A | 11/1988 | Rosenberg |
| 4,789,005 A | 12/1988 | Griffiths |
| 4,796,660 A | 1/1989 | Bron |
| 4,807,668 A | 2/1989 | Roberts |
| 4,817,875 A | 4/1989 | Karmeli |
| 4,824,019 A | 4/1989 | Lew |
| 4,824,025 A | 4/1989 | Miller |
| 4,850,531 A | 7/1989 | Littleton |
| 4,854,158 A | 8/1989 | Gates |
| 4,856,552 A | 8/1989 | Hiemstra |
| 4,859,264 A | 8/1989 | Buluschek |
| 4,862,731 A | 9/1989 | Gates |
| 4,874,132 A | 10/1989 | Gilead |
| 4,880,167 A | 11/1989 | Langa |
| 4,900,437 A | 2/1990 | Savall |
| 4,909,411 A | 3/1990 | Uchida |
| 4,930,934 A | 6/1990 | Adkins |
| 4,935,992 A | 6/1990 | Due |
| 4,948,295 A | 8/1990 | Pramsoler |
| 4,984,739 A | 1/1991 | Allport |
| 4,990,256 A | 2/1991 | Schmidt |
| 5,022,940 A | 6/1991 | Mehoudar |
| 5,031,837 A | 7/1991 | Hanish |
| 5,040,770 A | 8/1991 | Rajster |
| 5,052,625 A | 10/1991 | Ruskin |
| 5,096,206 A | 3/1992 | Andre |
| 5,106,021 A | 4/1992 | Gilead |
| 5,111,995 A | 5/1992 | Dumitrascu |
| 5,111,996 A | 5/1992 | Eckstein |
| 5,116,414 A | 5/1992 | Burton |
| 5,118,042 A | 6/1992 | Delmer |
| 5,118,215 A | 6/1992 | Freier |
| 5,122,044 A | 6/1992 | Mehoudar |
| 5,123,984 A | 6/1992 | Allport |
| 5,137,216 A | 8/1992 | Hanish |
| 5,141,360 A | 8/1992 | Zeman |
| 5,163,622 A | 11/1992 | Cohen |
| 5,181,952 A | 1/1993 | Burton |
| 5,183,208 A | 2/1993 | Cohen |
| 5,192,027 A | 3/1993 | Delmer |
| 5,200,132 A | 4/1993 | Shfaram |
| 5,203,503 A | 4/1993 | Cohen |
| 5,207,386 A | 5/1993 | Mehoudar |
| 5,216,784 A | 6/1993 | Dyer |
| 5,232,159 A | 8/1993 | Abbate |
| 5,232,160 A | 8/1993 | Hendrickson |
| 5,236,130 A | 8/1993 | Hadar |
| 5,246,171 A | 9/1993 | Roberts |
| 5,252,162 A | 10/1993 | Delmer |
| 5,253,807 A | 10/1993 | Newbegin |
| 5,271,786 A | 12/1993 | Gorney |
| 5,279,462 A | 1/1994 | Mehoudar |
| 5,282,578 A | 2/1994 | De Frank |
| 5,282,916 A | 2/1994 | Bloom |
| 5,283,916 A | 2/1994 | Haro |
| 5,294,058 A | 3/1994 | Einav |
| 5,294,212 A | 3/1994 | Mehoudar |
| 5,295,506 A * | 3/1994 | Smith .................. E03C 1/104 239/267 |
| 5,310,438 A | 5/1994 | Ruskin |
| 5,314,116 A | 5/1994 | Krauth |
| 5,316,220 A | 5/1994 | Dinur |
| 5,318,657 A | 6/1994 | Roberts |
| 5,324,371 A | 6/1994 | Mehoudar |
| 5,324,379 A | 6/1994 | Eckstein |
| 5,327,941 A | 7/1994 | Bitsakis |
| 5,330,107 A | 7/1994 | Karathanos |
| 5,332,160 A | 7/1994 | Ruskin |
| 5,333,793 A | 8/1994 | Defrank |
| 5,337,597 A | 8/1994 | Peake |
| 5,340,027 A | 8/1994 | Yu |
| 5,353,993 A | 10/1994 | Rosenberg |
| 5,360,145 A | 11/1994 | Gueret |
| 5,364,032 A | 11/1994 | De Frank |
| 5,399,160 A | 3/1995 | Dunberger |
| 5,400,967 A | 3/1995 | Yu |
| 5,400,973 A | 3/1995 | Cohen |
| 5,413,282 A | 5/1995 | Boswell |
| 5,423,501 A | 6/1995 | Yu |
| 5,441,203 A | 8/1995 | Swan |
| 5,442,001 A | 8/1995 | Jones |
| 5,443,212 A | 8/1995 | Dinur |
| 5,449,250 A | 9/1995 | Burton |
| 5,458,712 A | 10/1995 | DeFrank |
| 5,465,905 A | 11/1995 | Elder |
| 5,507,436 A | 4/1996 | Ruttenberg |
| 5,522,551 A | 6/1996 | Defrank |
| 5,531,381 A | 7/1996 | Ruttenberg |
| 5,535,778 A | 7/1996 | Zakai |
| 5,553,786 A | 9/1996 | Israel |
| 5,584,952 A | 12/1996 | Rubenstein |
| 5,586,727 A | 12/1996 | Shekalim |
| 5,591,293 A | 1/1997 | Miller |
| 5,601,381 A | 2/1997 | Hadar |
| 5,609,303 A | 3/1997 | Cohen |
| 5,615,833 A | 4/1997 | Robillard |
| 5,615,838 A | 4/1997 | Eckstein |
| 5,620,143 A | 4/1997 | Delmer |
| 5,628,462 A | 5/1997 | Miller |
| 5,634,594 A | 6/1997 | Cohen |
| 5,636,797 A | 6/1997 | Cohen |
| 5,641,113 A | 6/1997 | Somaki |
| 5,651,999 A | 7/1997 | Armentrout |
| 5,673,852 A | 10/1997 | Roberts |
| 5,676,897 A | 10/1997 | Dermitzakis |
| 5,688,072 A | 11/1997 | Meyer |
| 5,692,858 A | 12/1997 | Vaughan |
| 5,695,127 A | 12/1997 | Delmer |
| 5,711,482 A | 1/1998 | Yu |
| 5,722,601 A | 3/1998 | Defrank |
| 5,727,733 A | 3/1998 | Ruttenberg |
| 5,732,887 A | 3/1998 | Roberts |
| 5,744,423 A | 4/1998 | Voris |
| 5,744,779 A | 4/1998 | Buluschek |
| RE35,857 E | 7/1998 | Mehoudar |
| 5,785,785 A | 7/1998 | Delmer |
| 5,813,603 A | 9/1998 | Kurtz |
| 5,820,028 A | 10/1998 | Dinur |
| 5,820,029 A | 10/1998 | Marans |
| 5,829,685 A | 11/1998 | Cohen |
| 5,829,686 A | 11/1998 | Cohen |
| 5,855,324 A | 1/1999 | Defrank |
| 5,865,377 A | 2/1999 | Defrank |
| 5,871,325 A | 2/1999 | Schmidt |
| 5,875,815 A | 3/1999 | Ungerecht |
| 5,881,796 A | 3/1999 | Brown |
| 5,887,640 A | 3/1999 | Brown |
| 5,893,404 A | 4/1999 | Mendez |

(56) References Cited

U.S. PATENT DOCUMENTS

| | | |
|---|---|---|
| 5,898,019 A | 4/1999 | Van Voris |
| 5,938,372 A | 8/1999 | Lichfield |
| 5,944,260 A | 8/1999 | Wang |
| 5,957,391 A | 9/1999 | Defrank |
| 5,972,375 A | 10/1999 | Truter |
| 5,988,211 A | 11/1999 | Cornell |
| 5,996,909 A | 12/1999 | Lin |
| 6,015,102 A | 1/2000 | Daigle |
| 6,026,850 A | 2/2000 | Newton |
| 6,027,048 A | 2/2000 | Mehoudar |
| 6,039,270 A | 3/2000 | Dermitzakis |
| 6,062,245 A | 5/2000 | Berglind |
| 6,085,986 A | 7/2000 | Yu |
| 6,095,185 A | 8/2000 | Rosenberg |
| 6,109,296 A | 8/2000 | Austin |
| 6,116,523 A | 9/2000 | Cabahug |
| 6,120,634 A | 9/2000 | Harrold |
| 6,164,605 A | 12/2000 | Drake |
| 6,179,949 B1 | 1/2001 | Buluschek |
| 6,180,162 B1 | 1/2001 | Shigeru |
| 6,206,305 B1 | 3/2001 | Mehoudar |
| 6,213,408 B1 | 4/2001 | Shekalim |
| 6,238,081 B1 | 5/2001 | Sand |
| 6,250,571 B1 | 6/2001 | Cohen |
| 6,280,554 B1 | 8/2001 | Lambert |
| 6,302,338 B1 | 10/2001 | Cohen |
| 6,305,617 B1 | 10/2001 | Yu |
| 6,308,768 B1 | 10/2001 | Rice |
| 6,308,902 B1 | 10/2001 | Huntley |
| D450,550 S | 11/2001 | Roberts |
| 6,334,958 B1 | 1/2002 | Ruskin |
| 6,343,616 B1 | 2/2002 | Houtchens |
| D455,055 S | 4/2002 | Roberts |
| 6,371,390 B1 | 4/2002 | Cohen |
| 6,382,530 B1 | 5/2002 | Perkins |
| 6,394,368 B1 | 5/2002 | Hintz |
| 6,394,412 B2 | 5/2002 | Zakai |
| 6,403,013 B1 | 6/2002 | Man |
| 6,449,872 B1 | 9/2002 | Olkku |
| 6,460,786 B1 | 10/2002 | Roberts |
| 6,461,468 B1 | 10/2002 | Cohen |
| 6,461,486 B2 | 10/2002 | Lorincz |
| 6,464,152 B1 | 10/2002 | Bolinis |
| 6,499,687 B2 | 12/2002 | Bryant |
| 6,499,872 B2 | 12/2002 | Sand |
| 6,513,734 B2 | 2/2003 | Bertolotti |
| 6,543,509 B1 | 4/2003 | Harrold |
| 6,557,819 B2 | 5/2003 | Austin |
| 6,561,443 B2 | 5/2003 | Delmer |
| 6,568,607 B2 | 5/2003 | Boswell |
| 6,581,262 B1 | 6/2003 | Myers |
| 6,581,854 B2 | 6/2003 | Eckstein |
| 6,581,902 B2 | 6/2003 | Michau |
| 6,620,278 B1 | 9/2003 | Harrold |
| 6,622,427 B2 | 9/2003 | Breitner |
| 6,622,946 B2 | 9/2003 | Held |
| 6,640,879 B2 | 11/2003 | Richard |
| 6,691,739 B2 | 2/2004 | Rosenberg |
| 6,736,337 B2 | 5/2004 | Vildibill |
| 6,750,760 B2 | 6/2004 | Albritton |
| 6,764,029 B2 | 7/2004 | Rosenberg |
| 6,817,548 B2 | 11/2004 | Krauth |
| 6,821,928 B2 | 11/2004 | Ruskin |
| 6,827,298 B2 | 12/2004 | Sacks |
| 6,830,062 B2 | 12/2004 | Montpetit |
| 6,830,203 B2 | 12/2004 | Neyestani |
| 6,866,067 B2 | 3/2005 | Lim |
| 6,875,491 B2 | 4/2005 | Miyamoto |
| 6,886,761 B2 | 5/2005 | Cohen |
| 6,894,250 B2 | 5/2005 | Kertscher |
| 6,896,758 B1 | 5/2005 | Giuffre' |
| 6,920,907 B2 | 7/2005 | Harrold |
| 6,928,708 B1 | 8/2005 | Larock |
| 6,933,337 B2 | 8/2005 | Lang |
| 6,936,126 B2 | 8/2005 | Defrank |
| 6,945,476 B2 | 9/2005 | Giuffre |
| 6,959,882 B1 | 11/2005 | Potts |
| 6,996,932 B2 | 2/2006 | Kruer |
| 6,997,402 B2 | 2/2006 | Kruer |
| 7,007,916 B2 | 3/2006 | Lee |
| 7,048,010 B2 | 5/2006 | Golan |
| 7,108,205 B1 | 9/2006 | Hashimshony |
| 7,175,113 B2 | 2/2007 | Cohen |
| 7,241,825 B2 | 7/2007 | Koga |
| 7,270,280 B2 | 9/2007 | Belford |
| 7,284,302 B2 | 10/2007 | Lares |
| 7,300,004 B2 | 11/2007 | Sinden |
| 7,363,938 B1 | 4/2008 | Newton |
| 7,392,614 B2 | 7/2008 | Kruer |
| 7,410,108 B2 | 8/2008 | Rabinowitz |
| 7,445,021 B2 | 11/2008 | Newton |
| 7,445,168 B2 | 11/2008 | Ruskin |
| 7,455,094 B2 | 11/2008 | Lee |
| 7,506,658 B2 | 3/2009 | Guest |
| 7,530,382 B2 | 5/2009 | Kertscher |
| 7,647,724 B2 | 1/2010 | Caron |
| 7,648,085 B2 | 1/2010 | Mavrakis |
| 7,658,420 B2 | 2/2010 | Harger |
| 7,681,805 B2 | 3/2010 | Belford |
| 7,681,810 B2 | 3/2010 | Keren |
| 7,695,587 B2 | 4/2010 | Kertscher |
| 7,712,253 B2 | 5/2010 | Gesser |
| 7,735,758 B2 | 6/2010 | Cohen |
| D620,550 S | 7/2010 | Feith |
| 7,748,930 B2 | 7/2010 | Gesser |
| 7,775,237 B2 | 8/2010 | Keren |
| 7,802,592 B2 | 9/2010 | McCarty |
| 7,862,254 B2 | 1/2011 | Jin Hyun |
| 7,887,664 B1 | 2/2011 | Mata |
| 7,900,656 B2 | 3/2011 | Masarwa |
| 7,913,935 B2 | 3/2011 | Einav |
| 7,954,732 B2 | 6/2011 | Shekalim |
| 7,988,076 B2 | 8/2011 | Mamo |
| 7,989,076 B2 | 8/2011 | Li |
| 8,002,496 B2 | 8/2011 | Giuffre |
| 8,011,852 B2 | 9/2011 | Gesser |
| 8,033,300 B2 | 10/2011 | McCarty |
| 8,038,082 B2 | 10/2011 | Belford |
| D648,191 S | 11/2011 | Thayer |
| 8,051,871 B2 | 11/2011 | Shani |
| 8,079,385 B2 | 12/2011 | Hatton |
| 8,091,276 B2 | 1/2012 | Gesser |
| 8,091,800 B2 | 1/2012 | Retter |
| 8,096,491 B2 | 1/2012 | Lutzki |
| 8,132,739 B2 | 3/2012 | Théorêt |
| 8,136,246 B2 | 3/2012 | So |
| 8,141,589 B2 | 3/2012 | Socolsky |
| D657,638 S | 4/2012 | Einav |
| 8,157,941 B2 | 4/2012 | Voigtmann |
| 8,167,002 B2 | 5/2012 | Kuhne |
| 8,220,727 B2 | 7/2012 | Lee |
| 8,267,115 B2 | 9/2012 | Giuffre' |
| 8,286,667 B2 | 10/2012 | Ruskin |
| 8,302,887 B2 | 11/2012 | Park |
| 8,317,111 B2 | 11/2012 | Cohen |
| 8,348,182 B2 | 1/2013 | Keren |
| 8,372,326 B2 | 2/2013 | Mamo |
| 8,381,437 B2 | 2/2013 | Ciudaj |
| 8,439,282 B2 | 5/2013 | Allen |
| 8,454,786 B2 | 6/2013 | Guichard |
| 8,469,294 B2 | 6/2013 | Mata |
| 8,475,617 B2 | 7/2013 | Kertscher |
| 8,496,193 B2 | 7/2013 | Rosenberg |
| 8,511,585 B2 | 8/2013 | Keren |
| 8,511,586 B2 | 8/2013 | Einav |
| 8,579,215 B2 | 11/2013 | Zavoli |
| 8,584,398 B2 | 11/2013 | Gesser |
| 8,628,032 B2 | 1/2014 | Feith |
| 8,663,525 B2 | 3/2014 | Mamo |
| 8,689,484 B2 | 4/2014 | Ruskin |
| 8,714,181 B2 | 5/2014 | Shani |
| 8,714,205 B2 | 5/2014 | Loebinger |
| 8,763,934 B2 | 7/2014 | Patel |
| 8,770,888 B2 | 7/2014 | Helbig |

(56) References Cited

U.S. PATENT DOCUMENTS

| | | |
|---|---|---|
| 8,870,098 B2 | 10/2014 | Lutzki |
| 8,882,004 B2 | 11/2014 | Gorney |
| 8,893,987 B2 | 11/2014 | Lerner |
| 8,998,112 B2 | 4/2015 | Cohen |
| 8,998,113 B2 | 4/2015 | Keren |
| 9,022,059 B2 | 5/2015 | Cohen |
| 9,022,764 B2 | 5/2015 | Wisler |
| 9,027,856 B2 | 5/2015 | Defrank |
| D740,940 S | 10/2015 | Fregoso |
| 9,167,757 B2 | 10/2015 | Hamann |
| 9,173,353 B2 | 11/2015 | Hamann |
| 9,173,354 B2 | 11/2015 | Hamann |
| 9,179,610 B2 | 11/2015 | Hamann |
| 9,192,108 B2 | 11/2015 | Kertscher |
| 9,241,449 B2 | 1/2016 | Hamann |
| 9,253,950 B1 | 2/2016 | Clark |
| 9,253,951 B2 | 2/2016 | Herrera |
| 9,258,949 B2 | 2/2016 | Nourian |
| 9,258,950 B2 | 2/2016 | Kidachi |
| 9,291,276 B2 | 3/2016 | Keren |
| 9,307,705 B2 | 4/2016 | Akritanakis |
| 9,345,205 B2 | 5/2016 | Kidachi |
| 9,380,749 B2 | 7/2016 | Akritanakis |
| 9,386,752 B2 | 7/2016 | Einav |
| 9,433,157 B2 | 9/2016 | Dermitzakis |
| 9,439,366 B2 | 9/2016 | Kidachi |
| 9,485,923 B2 | 11/2016 | Ensworth |
| 9,521,813 B2 * | 12/2016 | Richardson ........... E02B 11/005 |
| D781,115 S | 3/2017 | Einav |
| 9,695,965 B2 | 7/2017 | Hadas |
| 9,743,595 B2 | 8/2017 | Mavrakis |
| 9,807,948 B2 | 11/2017 | Loebinger |
| 9,814,189 B1 | 11/2017 | Clark |
| 9,821,335 B2 | 11/2017 | Burrous |
| 9,872,444 B2 | 1/2018 | Turk |
| 9,877,440 B2 | 1/2018 | Ensworth |
| 9,877,441 B2 | 1/2018 | Ensworth |
| 9,877,442 B2 | 1/2018 | Kim |
| D811,179 S | 2/2018 | Ensworth |
| 9,894,850 B2 | 2/2018 | Kidachi |
| 9,894,851 B2 | 2/2018 | Desarzens |
| 9,938,680 B2 | 4/2018 | Smith |
| 9,949,448 B2 | 4/2018 | Cohen |
| D816,438 S | 5/2018 | Beutler |
| D816,439 S | 5/2018 | Crook |
| 10,010,030 B2 | 7/2018 | Motha |
| 10,034,439 B2 | 7/2018 | Kidachi |
| D826,662 S | 8/2018 | Ensworth |
| 10,070,595 B2 | 9/2018 | Loebinger |
| 10,085,391 B2 | 10/2018 | Haub |
| 10,107,707 B2 | 10/2018 | Defrank |
| 10,172,302 B2 | 1/2019 | Keren |
| 10,212,896 B2 | 2/2019 | Kidachi |
| 10,219,452 B2 | 3/2019 | Kidachi |
| 10,271,484 B2 | 4/2019 | Einav |
| 10,299,444 B2 | 5/2019 | Cohen |
| 10,327,396 B2 | 6/2019 | Kidachi |
| 10,349,587 B2 | 7/2019 | Einav |
| 10,356,989 B2 | 7/2019 | Kidachi |
| 10,362,740 B2 | 7/2019 | Kidachi |
| 10,375,904 B2 | 8/2019 | Ensworth |
| 10,383,290 B2 | 8/2019 | Kidachi |
| 10,455,780 B2 | 10/2019 | Cohen |
| 10,462,983 B2 | 11/2019 | Socolsky |
| 10,517,236 B2 | 12/2019 | Keren |
| 10,542,683 B2 | 1/2020 | Morikoshi |
| 10,588,274 B2 | 3/2020 | Noguchi |
| 10,595,476 B2 | 3/2020 | Morikoshi |
| 10,609,876 B2 | 4/2020 | Morikoshi |
| D883,048 S | 5/2020 | Ensworth |
| 10,716,268 B2 | 7/2020 | Loebinger |
| 10,772,266 B2 | 9/2020 | Socolsky |
| 10,834,878 B2 | 11/2020 | Morikoshi |
| 10,842,090 B2 | 11/2020 | Mavrakis |
| 11,116,152 B2 | 9/2021 | Yanagisawa |
| 11,134,625 B2 | 10/2021 | Niquet |
| 11,252,879 B2 | 2/2022 | Socolsky |
| 11,274,781 B1 | 3/2022 | Kamerath |
| 11,337,384 B2 | 5/2022 | Schweitzer |
| 11,452,269 B2 | 9/2022 | Taylor, Jr. |
| 11,793,127 B2 | 10/2023 | Socolsky |
| 2002/0064935 A1 | 5/2002 | Honda |
| 2002/0070297 A1 | 6/2002 | Bolinis |
| 2002/0074434 A1 | 6/2002 | Delmer |
| 2002/0088877 A1 | 7/2002 | Bertolotti |
| 2002/0098322 A1 | 7/2002 | Cripp |
| 2002/0104902 A1 | 8/2002 | Eckstein |
| 2002/0104903 A1 | 8/2002 | Eckstein |
| 2002/0113147 A1 | 8/2002 | Huntley |
| 2003/0029937 A1 | 2/2003 | Dermitzakis |
| 2003/0042335 A1 | 3/2003 | Krauth |
| 2003/0050372 A1 | 3/2003 | Stanhope |
| 2003/0057301 A1 | 3/2003 | Cohen |
| 2003/0089409 A1 | 5/2003 | Morimoto |
| 2003/0089803 A1 | 5/2003 | Huntley |
| 2003/0090369 A1 | 5/2003 | Albritton |
| 2003/0092808 A1 | 5/2003 | Stanhope |
| 2003/0140977 A1 | 7/2003 | Berton |
| 2003/0150940 A1 | 8/2003 | Vildibill |
| 2003/0226913 A1 | 12/2003 | Brunnengraeber |
| 2004/0018263 A1 | 1/2004 | Hashimshony |
| 2004/0046045 A1 | 3/2004 | Alexander |
| 2004/0164185 A1 | 8/2004 | Giuffre |
| 2004/0195391 A1 | 10/2004 | Kruer |
| 2004/0222321 A1 | 11/2004 | Golan |
| 2004/0240940 A1 | 12/2004 | Ericksen |
| 2005/0029231 A1 | 2/2005 | Kertscher |
| 2005/0077396 A1 | 4/2005 | Rabinowitz |
| 2005/0103409 A1 | 5/2005 | Weber |
| 2005/0133613 A1 | 6/2005 | Mayer |
| 2005/0145716 A1 | 7/2005 | Manning |
| 2005/0224607 A1 | 10/2005 | Dinur |
| 2005/0224962 A1 | 10/2005 | Akamatsu |
| 2005/0258278 A1 | 11/2005 | Cohen |
| 2005/0258279 A1 | 11/2005 | Harrold |
| 2005/0279856 A1 | 12/2005 | Nalbandian |
| 2005/0279866 A1 | 12/2005 | Belford |
| 2005/0284966 A1 | 12/2005 | Defrank |
| 2006/0032949 A1 | 2/2006 | Lo |
| 2006/0043219 A1 | 3/2006 | Raanan |
| 2006/0144965 A1 | 7/2006 | Keren |
| 2006/0163388 A1 | 7/2006 | Mari |
| 2006/0169805 A1 | 8/2006 | Dabir |
| 2006/0185241 A1 | 8/2006 | Theoret |
| 2006/0186228 A1 | 8/2006 | Belford |
| 2006/0202381 A1 | 9/2006 | Bach |
| 2006/0237561 A1 | 10/2006 | Park |
| 2006/0255186 A1 | 11/2006 | Ruskin |
| 2006/0272201 A1 | 12/2006 | Pellenc |
| 2006/0272726 A1 | 12/2006 | Golan |
| 2007/0095950 A1 | 5/2007 | Kim |
| 2007/0108318 A1 | 5/2007 | Mamo |
| 2007/0138323 A1 | 6/2007 | Lee |
| 2007/0144065 A1 | 6/2007 | Lowe |
| 2007/0175580 A1 | 8/2007 | Mata |
| 2007/0187031 A1 | 8/2007 | Kertscher |
| 2007/0194149 A1 | 8/2007 | Mavrakis |
| 2008/0041978 A1 | 2/2008 | Keren |
| 2008/0067266 A1 | 3/2008 | Cohen |
| 2008/0099584 A1 | 5/2008 | Raanan |
| 2008/0105768 A1 | 5/2008 | Kertscher |
| 2008/0190256 A1 | 8/2008 | So |
| 2008/0237374 A1 | 10/2008 | Belford |
| 2008/0257991 A1 | 10/2008 | Einav |
| 2008/0265064 A1 | 10/2008 | Keren |
| 2008/0271366 A1 | 11/2008 | Thompson |
| 2008/0282609 A1 | 11/2008 | Nelson |
| 2009/0020634 A1 | 1/2009 | Schweitzer |
| 2009/0065084 A1 | 3/2009 | Masarwa |
| 2009/0145985 A1 | 6/2009 | Mayer |
| 2009/0159726 A1 | 6/2009 | Thompson |
| 2009/0165879 A1 | 7/2009 | Socolsky |
| 2009/0173811 A1 | 7/2009 | Gorney |
| 2009/0224078 A1 | 9/2009 | Anderson |

(56) References Cited

U.S. PATENT DOCUMENTS

| | | |
|---|---|---|
| 2009/0243146 A1 | 10/2009 | Retter |
| 2009/0261183 A1 | 10/2009 | Mavrakis |
| 2009/0266919 A1 | 10/2009 | Mavrakis |
| 2009/0283613 A1 | 11/2009 | Barkai |
| 2009/0302127 A1 | 12/2009 | Lutzki |
| 2009/0314377 A1 | 12/2009 | Giuffre |
| 2009/0320932 A1 | 12/2009 | Giuffre |
| 2010/0000674 A1 | 1/2010 | Voigtmann |
| 2010/0023717 A1 | 1/2010 | Jinno |
| 2010/0096478 A1 | 4/2010 | Mamo |
| 2010/0096479 A1 | 4/2010 | Mamo |
| 2010/0108785 A1 | 5/2010 | Lee |
| 2010/0126974 A1 | 5/2010 | Kertscher |
| 2010/0155503 A1 | 6/2010 | Dermitzakis |
| 2010/0155508 A1 | 6/2010 | Keren |
| 2010/0163651 A1 | 7/2010 | Feith |
| 2010/0175408 A1 | 7/2010 | Korda |
| 2010/0219265 A1 | 9/2010 | Feld |
| 2010/0237170 A1 | 9/2010 | Rosenberg |
| 2010/0244315 A1 | 9/2010 | Mamo |
| 2010/0252126 A1 | 10/2010 | Roes |
| 2010/0252127 A1 | 10/2010 | Gross |
| 2010/0282873 A1 | 11/2010 | Mattlin |
| 2010/0319784 A1 | 12/2010 | Kuhne |
| 2011/0016682 A1 | 1/2011 | Wood |
| 2011/0186652 A1 | 8/2011 | Cohen |
| 2011/0226354 A1 | 9/2011 | Thordarson |
| 2012/0012678 A1 | 1/2012 | Gregory |
| 2012/0012682 A1 | 1/2012 | Einav |
| 2012/0074345 A1 | 3/2012 | Hatton |
| 2012/0097196 A1 | 4/2012 | Cohen |
| 2012/0097254 A1 | 4/2012 | Cohen |
| 2012/0097769 A1 | 4/2012 | Zavoli |
| 2012/0104648 A1 | 5/2012 | Yiflach |
| 2012/0111972 A1 | 5/2012 | Théorêt |
| 2012/0126036 A1 | 5/2012 | Patel |
| 2012/0160926 A1 | 6/2012 | Lutzki |
| 2012/0180875 A1 | 7/2012 | Keller |
| 2012/0199673 A1 | 8/2012 | Cohen |
| 2012/0256017 A1 | 10/2012 | Gorney |
| 2012/0267454 A1 | 10/2012 | Einav |
| 2012/0305676 A1 | 12/2012 | Keren |
| 2013/0074400 A1 | 3/2013 | Roess |
| 2013/0181066 A1 | 7/2013 | Dermitzakis |
| 2013/0183097 A1 | 7/2013 | Scantling |
| 2013/0248616 A1 | 9/2013 | Ensworth |
| 2013/0248622 A1 | 9/2013 | Kim |
| 2013/0340338 A1 | 12/2013 | Lin |
| 2013/0341431 A1 | 12/2013 | Ensworth |
| 2014/0027539 A1 | 1/2014 | Kim |
| 2014/0034753 A1 | 2/2014 | Mavrakis |
| 2014/0110506 A1 | 4/2014 | Mavrakis |
| 2014/0246520 A1 | 9/2014 | Einav |
| 2014/0252103 A1 | 9/2014 | Hamann |
| 2014/0252112 A1 | 9/2014 | Hamann |
| 2014/0252113 A1 | 9/2014 | Hamann |
| 2014/0252114 A1 | 9/2014 | Hamann |
| 2014/0252133 A1 | 9/2014 | Hamann |
| 2014/0263758 A1 | 9/2014 | Turk |
| 2015/0014446 A1 | 1/2015 | Cohen |
| 2015/0041563 A1 | 2/2015 | Ensworth |
| 2015/0041564 A1 | 2/2015 | Ensworth |
| 2015/0090815 A1 | 4/2015 | Akritanakis |
| 2015/0090816 A1 | 4/2015 | Akritanakis |
| 2015/0107777 A1 | 4/2015 | Zakarian |
| 2015/0144717 A1 | 5/2015 | Turk |
| 2015/0181816 A1 | 7/2015 | Desarzens |
| 2015/0181820 A1 | 7/2015 | Crook |
| 2015/0201568 A1 | 7/2015 | Einav |
| 2015/0223414 A1 | 8/2015 | Kidachi |
| 2015/0250111 A1 | 9/2015 | Kidachi |
| 2015/0296723 A1 | 10/2015 | Jain |
| 2015/0319940 A1 | 11/2015 | Kidachi |
| 2015/0351333 A1 | 12/2015 | Eberle |
| 2016/0057947 A1 | 3/2016 | Ensworth |
| 2016/0075070 A1 | 3/2016 | Verelis |
| 2016/0076965 A1 | 3/2016 | Edris |
| 2016/0088806 A1 | 3/2016 | Haub |
| 2016/0095285 A1 | 4/2016 | Loebinger |
| 2016/0113218 A1 | 4/2016 | Turk |
| 2016/0143231 A2 | 5/2016 | Motha |
| 2016/0146388 A1 | 5/2016 | Smith |
| 2016/0198643 A1 | 7/2016 | Cohen |
| 2016/0219802 A1 | 8/2016 | Ensworth |
| 2016/0219803 A1 | 8/2016 | Keren |
| 2016/0223092 A1 | 8/2016 | Hadas |
| 2016/0227716 A1 | 8/2016 | Kidachi |
| 2016/0262319 A1 | 9/2016 | Defrank |
| 2016/0278311 A1 | 9/2016 | Kidachi |
| 2016/0286741 A1 | 10/2016 | Kidachi |
| 2016/0286743 A1 | 10/2016 | Einav |
| 2016/0295815 A1 | 10/2016 | Defrank |
| 2016/0309669 A1 | 10/2016 | Kidachi |
| 2016/0330917 A1 | 11/2016 | Kidachi |
| 2017/0035005 A1 | 2/2017 | Kidachi |
| 2017/0035006 A1 | 2/2017 | Kim |
| 2017/0112078 A1 | 4/2017 | Ensworth |
| 2017/0118927 A1 | 5/2017 | Loebinger |
| 2017/0142916 A1 | 5/2017 | Shamshery |
| 2017/0205013 A1 | 7/2017 | Smith |
| 2017/0290277 A1 | 10/2017 | Cohen |
| 2017/0292646 A1 | 10/2017 | Hadas |
| 2018/0014477 A1 | 1/2018 | Ensworth |
| 2018/0027756 A1 | 2/2018 | Kidachi |
| 2018/0098514 A1 | 4/2018 | Socolsky |
| 2018/0110191 A1 | 4/2018 | Keren |
| 2018/0116134 A1 | 5/2018 | Ensworth |
| 2018/0168116 A1 | 6/2018 | Morikoshi |
| 2018/0168117 A1 | 6/2018 | Noguchi |
| 2018/0177145 A1 | 6/2018 | Morikoshi |
| 2018/0199524 A1 | 7/2018 | Socolsky |
| 2018/0213732 A1 | 8/2018 | Ensworth |
| 2018/0228097 A1 | 8/2018 | Alkalay |
| 2018/0266576 A1 | 9/2018 | Balet |
| 2018/0317406 A1 | 11/2018 | Tsouri |
| 2018/0328498 A1 | 11/2018 | Rulli |
| 2018/0338434 A1 | 11/2018 | Wlassich |
| 2018/0359962 A1 | 12/2018 | Noguchi |
| 2019/0246577 A1 | 8/2019 | Masarwa |
| 2019/0246578 A1 | 8/2019 | Einav |
| 2019/0335687 A1 | 11/2019 | Socolsky |
| 2019/0373827 A1 | 12/2019 | Ensworth |
| 2019/0388924 A1 | 12/2019 | Yanagisawa |
| 2020/0084981 A1 | 3/2020 | Yanagisawa |
| 2020/0093076 A1 | 3/2020 | Yanagisawa |
| 2020/0288653 A1 | 9/2020 | Socolsky |
| 2020/0390043 A1 | 12/2020 | Taylor, Jr. |
| 2021/0037726 A1 | 2/2021 | Yanagisawa |
| 2021/0037727 A1 | 2/2021 | Yanagisawa |
| 2021/0037728 A1 | 2/2021 | Mavrakis |
| 2021/0071805 A1 | 3/2021 | Masarwa |
| 2021/0176928 A1 | 6/2021 | Ono |
| 2021/0204492 A1 | 7/2021 | Kidachi |
| 2021/0321582 A1 | 10/2021 | Hartranft |
| 2022/0046870 A1 | 2/2022 | Sokol |
| 2022/0117173 A1 | 4/2022 | Schweitzer |
| 2022/0132755 A1 | 5/2022 | Yankovitz |
| 2022/0268385 A1 | 8/2022 | Nelson |
| 2023/0200315 A1 | 6/2023 | Ana |
| 2023/0320292 A1 | 10/2023 | Geller |

FOREIGN PATENT DOCUMENTS

| | | |
|---|---|---|
| AU | 2007231848 | 5/2008 |
| CA | 1053726 | 5/1979 |
| CN | 1627994 | 6/2005 |
| CN | 102057823 | 5/2011 |
| CN | 201821716 | 5/2011 |
| CN | 201871438 | 6/2011 |
| CN | 202617872 | 12/2012 |
| CN | 102933071 | 2/2013 |
| DE | 112706 | 5/1975 |
| DE | 3525591 | 1/1986 |
| EP | 0160299 A2 | 11/1985 |

(56) References Cited

FOREIGN PATENT DOCUMENTS

| | | |
|---|---|---|
| EP | 0344605 A2 | 12/1989 |
| EP | 0353982 | 2/1990 |
| EP | 0444425 A1 | 9/1991 |
| EP | 0480632 A2 | 4/1992 |
| EP | 0491115 A1 | 6/1992 |
| EP | 0549515 A1 | 6/1993 |
| EP | 0636309 A1 | 2/1995 |
| EP | 0709020 A1 | 5/1996 |
| EP | 0730822 A2 | 9/1996 |
| EP | 0493299 | 5/1997 |
| EP | 0872172 A1 | 10/1998 |
| EP | 1372375 | 1/2004 |
| EP | 1541013 A2 | 6/2005 |
| EP | 1701147 | 9/2006 |
| EP | 2952091 A1 | 12/2015 |
| FR | 2366790 | 5/1978 |
| FR | 2704117 | 10/1994 |
| FR | 2704117 A1 | 10/1994 |
| GB | 1498545 | 1/1978 |
| GB | 2057960 A | 4/1981 |
| IL | 42705 A | 3/1976 |
| IL | 53463 A | 3/1983 |
| IL | 97564 A | 7/1996 |
| IL | 221089 | 5/2016 |
| IL | 212105 | 7/2016 |
| IT | 1255120 | 10/1995 |
| JP | 2000228417 | 8/2000 |
| JP | 2016220620 A | 12/2016 |
| RU | 2240682 | 1/2005 |
| RU | 2275791 | 3/2006 |
| RU | 90653 | 1/2010 |
| RU | 2415565 | 4/2011 |
| WO | 9205689 A1 | 4/1992 |
| WO | 9221228 A1 | 12/1992 |
| WO | 9427728 A1 | 12/1994 |
| WO | 1995029761 | 11/1995 |
| WO | 9614939 | 5/1996 |
| WO | 9810635 A1 | 3/1998 |
| WO | 9902273 A1 | 1/1999 |
| WO | 9918771 A1 | 4/1999 |
| WO | 9955141 A1 | 11/1999 |
| WO | 0001219 A1 | 1/2000 |
| WO | 0010378 A1 | 3/2000 |
| WO | 030760 | 6/2000 |
| WO | 136106 A1 | 5/2001 |
| WO | 0156768 A1 | 8/2001 |
| WO | 2001064019 | 9/2001 |
| WO | 0204130 A1 | 1/2002 |
| WO | 2002015670 | 2/2002 |
| WO | 2003045577 A1 | 6/2003 |
| WO | 2003066228 A1 | 8/2003 |
| WO | 2004028778 A1 | 4/2004 |
| WO | 2007046105 | 10/2005 |
| WO | 2006030419 A2 | 3/2006 |
| WO | 2006038246 | 4/2006 |
| WO | 2007068523 A1 | 6/2007 |
| WO | 2010022471 | 3/2010 |
| WO | 2010048063 | 4/2010 |
| WO | 2011092557 | 8/2011 |
| WO | 2011101842 | 8/2011 |
| WO | 2012015655 A1 | 2/2012 |
| WO | 2012120317 | 9/2012 |
| WO | 2012137200 | 10/2012 |
| WO | 2012160121 | 11/2012 |
| WO | 2013148672 | 10/2013 |
| WO | 2013155173 A2 | 10/2013 |
| WO | 2013192321 | 12/2013 |
| WO | 2014016832 | 1/2014 |
| WO | 2015023624 | 2/2015 |
| WO | 2015044801 | 4/2015 |
| WO | 2015052107 | 4/2015 |
| WO | 2015098412 | 7/2015 |
| WO | 2016065287 | 4/2016 |
| WO | 2016156814 | 10/2016 |
| WO | 2018078521 | 5/2018 |

OTHER PUBLICATIONS

Alapati, Nanda K., Netafim Letter dated Mar. 30, 2012 with enclosure and attachments, 13 pages.
Alapati, Nanda K., Netafim Letter dated Mar. 30, 2012 with enclosure, 6 pages.
Arduini, I., et al., "Influence of Copper on Root Growth and Morphology of Pinus Pinea L. and Pinus Pinaster Ait. Seedlings," Tree Physiology, 15, 1995, pp. 411-415.
ASME 2015 International Design Engineering Technical Conferences & Computers and Information in Engineering Conference, K. Taylor et al., "A Mathematical Model For Pressure Compensating Emitters", Aug. 2-5, 2015, Boston, Massachusetts, USA, 10 pp.
Bernard, H., et al., "Assessment of herbicide leaching risk in two tropical soils of Reunion Island (France)," J Environ Qual 34:534-543, (2005).
Beverage, K., "Drip Irrigation for Row Crops," New Mexico State University, 2001, pp. 1-43.
Borkow, G., et al., "A Novel Anti-Influenza Copper Oxide Containing Respiratory Face Mask," PLoS One, www.plosone.org, Jun. 2010, vol. 5, Issue 6, pp. 1-8.
Borkow, G., et al., "Copper as a Biocidal Tool," Current Medicinal Chemistry, 2005, 12, 2163-2175.
Borkow, G., et al., "Endowing Textiles with Permanent Potent Biocidal Properties by Impregnating Them with Copper Oxide," ResearchGate, Jan. 2006.
Borkow, G., et al., "Putting copper into action:copperimpregnated products with potent biocidal activities," FASEB J, 18:1728-1730, (2004).
Cetesb and Sindiplast, Environmental Guide of the Plastic Materials Recycling and Processing Industry [electronic resource], Technical elaboration: Gilmar do Amaral et al., Collaborators: Andre H.C. Botto e Souza et al., 2011. Retrieved from the Internet: <URL: http://file.sindiplast.org.br/download/guia_ambiental_internet.pdf>, 91 pages.
Coder, K., "Tree Root Growth Control Series: Root Control Barriers," The University of Georgia, Mar. 1998, pp. 1-7.
Crawford, M., "Copper-Coated Containers and Their Impact on the Environment," Spin Out, 2003, pp. 76-78.
Crawford, M., "Update On Copper Root Control," Spin Out, 1997.
DIG® Irrigation Product Catalog 2012, <www.digcorp.com>, 2012, 32 pages.
DIG® Irrigation Product Catalog 2016, <www.digcorp.com>, Nov. 9, 2016, 72 pages.
DIG® Irrigation Product Catalog 2018, <www.digcorp.com>, Oct. 23, 2017, 72 pages.
Diver, S., et al., "Sustainable Small-Scale Nursery Production," ATTRA, Nov. 2001, pp. 1-31.
Dixieline Lumber & Home Centers Catalog, DIG Irrigation Products Drip Tubing, 2003, p. 13.
Duke, K., et al., "Sewer Line Chemical Root Control with Emphasis on Foaming Methods Using Metam-Sodium and Dichiobenil," EPA United States Environmental Protection Agency, Sep. 1995.
Eason, Audra, et al., "Integrated modeling environment for state-wide assessment of groundwater vulnerability from pesticide use in agriculture," Pest Manag Sci, 60:739-745 (online:2004).
Eco iMat LLC dba ecorain® USA, iMat Solution, <www.ecorainusa.>, illustrating a product available since Nov. 25, 2015, 6 pages.
ECO Rain AG, iMat® Irrigation Mat, <http://www.ecorain.de/files/imat_irrigation_mat.pdf>, illustrating a product available since Sep. 18, 2016, 8 pp.
Ecorain USA, iMat FAQ document, illustrating a product available since 2017, 6 pp.
Encyclopaedia Britannica, Inc., "Peristalsis," Nov. 30, 2017, [online]. Retrieved from the Internet: <URL: https://www.britannica.com/print/article/452053 >, 2 pages.
EPO, Extended European Search Report issued in Application No. 13768209.2, Nov. 24, 2015 (10 pages).
Eurodrip U.S.A., Inc., 2009 Irrigation Products Catalog, p. 4-5, 4 pages.
Eurodrip U.S.A., Inc., Products Guide, copyright date Nov. 2007, 2 pages.
Fitch, Even, Tabin & Flannery; Letter, Apr. 23, 2008, 1 p.

(56) References Cited

OTHER PUBLICATIONS

Giles-Parker, C, EPA, Pesticide Fact Sheet, pp. 1-4.
http://aasystems.eu/dripper/; Advanced Automation Systems Ltd., Dec. 18, 2015, 12 pp.
http://aasystems.eu/products11.html; Advanced Automation Systems Ltd. (1 p., dated Jun. 20, 2013).
http://metzerplas.com/en-US/50/845/; Meterplas Cooperative Agricultural Organization Ltd., (2 pp., dated Jun. 20, 2013).
Hunter Industries, Drip Design Guide, Dec. 2012, 32 pages.
Intellectual Property India, the Patent Office, First Examination Report issued in Appln. No. IN201647007822, Sep. 17, 2020, 6 pp.
Irritec® On Line Drippers iDrop®, Irritec S.p.A, <www.irritec.com>, Nov. 5, 2014, 2 pages.
Irritec® Product Catalog and Price List 2016, Irritec USA Inc., <www.irritec.com>, Oct. 2, 2015, 66 pages.
Irritec™ USA iDrop™ PCDS, Irritec USA Inc., <www.irritecusa.com>, Jul. 26, 2012, 2 pages.
Jaffe, E., Netafim Ltd., Patent Dept., Letter with attached Appendices A-B, Aug. 1, 2010, 35 pages.
Jaffe, E., Netafim Ltd., Patent Dept., Letter with attached claim charts, Feb. 4, 2008, 6 pages.
Jaffe, E., Netafim Ltd., Patent Dept., Letter with attached claim charts, Jul. 12, 2009, 4 pages.
Jaffe, E., Netafim Ltd., Patent Dept., Letter with attachment, Feb. 4, 2008, 7 pages.
Jaffe, E., Netafim, Ltd., Patent Dept., Letter with attached invoice, May 7, 2008, 2 pages.
Jain Irrigation Inc., 2009 Product Catalog, pp. 12-13, copyright date 2009 (revised Oct. 2008), 4 pages.
Jain® Button Emitters, Jain Irrigation Inc., <www.jainsusa.com>, Jan. 5, 2015, 2 pages.
Jain® Emission Devices, Jain Irrigation Systems Ltd., <www.jainsusa.com>, Nov. 22, 2016, pp. 171-182.
Jain® Landscape Catalog, Jain Irrigation, Inc., <www.jainsusa.com>, Dec. 7, 2015, 102 pages.
Jain® Online Emitters, Jain Irrigation Systems Ltd., <www.jainsusa.com>, Mar. 12, 2015, 2pages.
Jiang, W. et al., "Effects of Copper on Root Growth, Cell Division, and Nucleolus of *Zea mays*," Biologia Plantarum, 44(1), 2001, pp. 105-109.
Kuhns, L. et al., "Copper Toxicity in Woody Ornamentals," Journal of Arboriculture, Apr. 1976. pp. 68-78.
Lady Bug Emitter, Rain Bird Sales, Inc., <https://web.archive.org/web/19980121011011/http://www.rainbird.com:80/rbturf/products/xeri/emission/ladybug.htm>, dated Dec. 1997, 2 pages.
Mastin, B.J., et al., "Toxicity and bioavailability of copper herbicides (Clearigate, Cutrine-Plus, and copper sulfate) to freshwater animals," Arch Environ Contam Toxicol, 39:445-451, (2000).
Metzerplas.com, OEM Drippers, Sep. 29, 2013, [online]. Retrieved from the Internet via the Internet Archive: Wayback Machine: <URL: http://metzerplas.com/en-US/48/865/> on Dec. 10, 2018, 2 pages.
Multi-Outlet Xeri-Bug™, Rain Bird Sales, Inc., <https://web.archive.org/web/19980121010952/http://www.rainbird.com:80/rbturf/products/xeri/emission/moutlet.htm>, 1997, 2 pages.
Murray-Gulde, C.L., et al., "Algicidal effectiveness of Clearigate, Cutrine-Plus, and copper sulfate and margins of safety associated with their use," Arch Environ Contam Toxicol 42:19-27, (2002).
NDS Inc., Agrifim Drip and Micro Irrigation Catalog, Jan. 2004, 3 pages.
Netafim International—Netafim USA—Internet site, 2003, 5 pages.
Netafim Ltd., Appendix A, images of Netafim's Drip Net product, 1 page.
Netafim Ltd., Appendix A, marked-up images of Netafim's Ram product, 1 page.
Netafim Ltd., Appendix B, Invoice, Jan. 31, 1991, 1 page.
Netafim Ltd., Appendix C, Netafim RAM Catalog, Jan. 2000, 4 pages.
Netafim Ltd., Appendix D, Englarged, marked-up excerpts from Netafim RAM Catalog, Jan. 2000, 1 page.
Netafim USA, Landscape & Turf Division Product Catalog, Aug. 2004, 36 pages.
Netafim USA, RAM Catalog Figures, Jan. 2000, 4 pages.
Netafim USA, Triton X Heavywall Dripperline Catalog, May 2007, 8 pages.
Netafim, RAM Pressure Compensating Dripperline brochure, Feb. 1997, 4 pages.
Netafim™ Non-Pressure Compensating Drippers, Netafim USA, <www.netafimusa.com>, Nov. 13, 2012, 2 pages.
Netafim™ Point Source Emitters, Netafim USA, <www.netafimusa.com>, Oct. 3, 2016, 4 pages.
Netafim™ Pressure Compensating (PC) Spray Stakes, Netafim USA, <www.netafimusa.com>, Feb. 26, 2013, 12 pages.
Netafim™ Pressure Compensating Drippers, Netafim USA, <www.netafimusa.com>, Jun. 1, 2018, 2 pages.
Netafim™ Pressure Compensating Drippers, Netafim USA, <www.netafimusa.com>, Apr. 2016, 2 pages.
Photograph of DIG® Product No. PCA-003CV, Nov. 21, 2015, 1 page.
Photograph of Irritec® Product No. A6-WPC2BB, Jul. 26, 2012, 1 page.
Photograph of Irritec® Product No. A6-WPC3BB, Jul. 26, 2012, 1 page.
Photograph of Jain® Product No. CTTPC2-CNL, Jan. 5, 2015, 1 page.
Photograph of Jain® Product No. CTTPC4-CNL, Jan. 5, 2015, 1 page.
Photograph of Netafim™ Product No. SPCV10, Oct. 3, 2016, 1 page.
Photograph of Netafim™ Product No. Techflow Emitter WPC20, Nov. 13, 2012, 1 page.
Photograph of Netafim™ Product No. WPC10, Nov. 13, 2012, 1 page.
Photograph of Netafim™ Woodpecker Junior Product No. 01WPCJL4, Jan. 2012, 1 page.
Photograph of Toro® Product No. DPC08-MA-Red, Jun. 22, 2012, 1 page.
Photographs of an in-line cylindrical drip emitter on sale or publicly disclosed more than a year before the filing of the instant application, 2 pages.
Pressure-Compensating Modules, Rain Bird Sales, Inc., <https://web.archive.org/web/19980121011024/http://www.rainbird.com:80/rbturf/products/xeri/emission/prescmp.htm>, 1997, 2 pages.
Price Book, Oct. 2015, Rivulis Irrigation, Oct. 2015 (Revised Apr. 28, 2016), <rivulis.com>, 116 pages.
Rain Bird Corporation, Agriculture Irrigation Equipment 1981 Catalog, 3 pages.
Rain Bird Corporation, Drip Watering System 1994 Catalog, 1993, 16 pages.
Rain Bird Corporation, Landscape Irrigation Products 1993-1994 Catalog, Feb. 1993, 5 pages.
Rain Bird Corporation, Landscape Irrigation Products 1993-1994 Catalog, p. 120, Feb. 1993, 3 pages.
Rain Bird Corporation, Landscape Irrigation Products 2001-2002 Catalog, Mar. 2001, 9 pages.
Rain Bird Corporation, Landscape Irrigation Products 2001-2002 Catalog, pp. 181-184, Mar. 2001, 6 pages.
Rain Bird Corporation, Landscape Irrigation Products 2005-2006 Catalog, Jun. 2004, 13 pages.
Rain Bird Corporation, Landscape Irrigation Products 2005-2006 Catalog, pp. 230-232; 247-250, Jun. 2004, 10 pages.
Rain Bird Corporation, Landscape Irrigation Products 2006-2007 Catalog, p. 222-224; 238-242, Jul. 2005, 11 pages.
Rain Bird Corporation, Nursery Equipment Catalog 1986/1987, 1986, 3 pages.
Rain Bird Corporation, PC Dripline Pressure Compensating Inline Emitter Tubing Catalog, Oct. 1998, 16 pages.
Rain Bird Corporation, Rain Bird PC Dripline brochure, copyright date Nov. 2000, 12 pages.
Rain Bird Corporation, Turf Irrigation Equipment 1982 Catalog, 1982, 4 pages.
Rain Bird Corporation, Turf Irrigation Equipment 1983 Catalog, 1983, 4 pages.

(56) References Cited

OTHER PUBLICATIONS

Rain Bird Corporation, Turf Irrigation Equipment 1985 Catalog, 1985, 3 pages.
Rain Bird Corporation, Turf Irrigation Equipment 1985 Catalog, p. 73, 1985, 3 pages.
Rain Bird Corporation, Turf Irrigation Equipment 1987 Catalog, 1987, 6 pages.
Rain Bird Multi-Outlet Xeri-Bug, 1998, 1 page.
Rain Bird Pressure-Compensating Module, 1998, 1 page.
Rain Bird Xeri-Bug, 1998, 3 pages.
Rain Bird® Consumer Products Catalog, Tubing, D33305-11, copyright date 2010, p. 48.
Rain Bird® Landscape Irrigation Products 1997-1998 Catalog, Component and Emmision Device, D48301, copyright date Aug. 1997, pp. 128-129.
Rain Bird® Landscape Irrigation Products 1999-2000 Catalog, Emission Devices, D37200, copyright date Aug. 1998, pp. 136-137.
Rain Bird® Landscape Irrigation Products 2004 New Products Catalog, D37200D, copyright date Oct. 2003, pp. 41-42.
Rain Bird® Landscape Irrigation Products 2008-2009 Catalog, D37200H, copyright date Sep. 2007, pp. 180-187.
Rain Bird® Landscape Irrigation Products, Rain Bird Dripline Series, RBE-03-TE-10, copyright date Aug. 2003, pp. 106-107.
Rain Bird® Nursery Equipment Catalog 1986-1987, D32304, copyright date 1986, p. 13.
Rain Bird® XF Series Dripline | Design, Installation and Maintenance Guide, D40024A, copyright date Feb. 2012, 48 pages.
Rain Bird® XFCV Dripline with Heavy-Duty Check Valve, D40215, copyright date Oct. 2012, 2 pages.
Rain Bird® XFD Dripline with Greater Flexiblity, D39994B, copyright date Jan. 2012, 2 pages.
Rain Bird® XFS Dripline with Copper Shield ™ Technology, D39978B, copyright date Jan. 2012, 2 pages.
Rain Tape Design Guide, Rain Bird®, D35252, document was published more than a year before the filing date of the instant application, 5 pages.
RAM Invoice Jan. 31, 1991.
Schifris, Seba et al., "Inhibition of root penetration in subsurface driplines by impregnating the drippers with copper oxide particles," Irrigation Science (2015) 33:4, pp. 319-324.
Siplast/Irritec Multibar Pressure Compensated Coextruded Dripline, Jul. 22, 2005, 4 pages.
Smiley, E. T., "Root Growth Near Vertical Root Barriers," International Society of Arboriculture, 1995, pp. 150-152.
Spera, G., et al., "Subsurface drip irrigation with microencapsulated trifluralin. Trifluralin residues in soils and cultivations," Commun Agric Appl Biol Sci 71:161-170, (2006).
State Intellectual Property Office of People's Republic of China, First Office Action issued in Application No. 201480045002.0, Apr. 16, 2018, 20 pp.
State Intellectual Property Office, First Office Action issued in Chinese Application No. 201380016629.9, Nov. 4, 2015, 16 pp.
The Clean Estuary Partnership, "Copper Sources in Urban Runoff and Shoreline Activities," TDC Environmental, LLC, 2004, pp. 1-72.
The Toro Company, 2000-2001 Irrigation Products Catalog, p. 28, copyright date Oct. 1999, 3 pages.
The Toro Company, Drip In Classic Turbulent Flow Dripline brochure, Jun. 2014, 4 pages.
The Toro Company, Drip In PC Brown Dripline brochure, 2015, 2 pages.
Toro® NGE® AL Anti-Drain Pressure Compensating Emitter, The Toro Company, <www.toro.com>, Jun. 23, 2012, 2 pages.
Toro® NGER® Emitters, The Toro Company, <www.toro.com>, May 16, 2018, 2 pages.
Toro® NGER® New Generation Emitters, The Toro Company, <www.toro.com>, Feb. 21, 2013, 2 pages.

Toro® NGER® SF Self-flushing Pressure Compensating Emitter, The Toro Company, <www.toro.com>, Jun. 22, 2012, 2 pages.
Toro® Turbo-SC® Plus Pressure-compensating Emitter, The Toro Company, <www.toro.com>, May 6, 2009, 2 pages.
Wagar, J. Alan, et al., "Effectiveness of Three Barrier Materials for Stopping Regenerating Roots of Established Trees," Journal of Arboriculture, 19(6), Nov. 1993, pp. 332-338.
Westgate, Philip J., "Preliminary Report on Copper Toxicity and Iron Chlorosis in Old Vegetable Fields," Florida State Horticultural Society, 1952, pp. 143-146.
USPTO; U.S. Appl. No. 17/077,244; Non-Final Rejection mailed Nov. 1, 2022; (pp. 1-10).
USPTO; U.S. Appl. No. 17/077,244; Final Rejection mailed May 1, 2023; (pp. 1-11).
USPTO; U.S. Appl. No. 17/077,244; Final Rejection mailed Oct. 16, 2023; (pp. 1-9).
Irrigation Assembly including elbow connectors made by the Rain Bird Corporation, assignee of the subject application. The irrigation assembly was installed outdoors and publicly accessible prior to Nov. 22, 2013, 3 pages.
United States Provisional U.S. Appl. No. 62/067,938, filed Oct. 23, 2014, entitled "Drip Emitter Tubing Expandable Into Grid," 35 pages.
Rain Bird Corporation, Comparison of QF Dripline Header to prior art PVC Header, publicly available Jan. 2015, 1 page.
PCT International Search Report and Written Opinion of the European Patent Office International Searching Authority for International Application PCT/US2015/057160, mailed Mar. 10, 2016, 7 pages.
Kisss, "Nano-Technical Specification: Subsurface Textile Irrigation (SSTI)," bearing an updated date of Jan. 2015, 2 pages.
Kisss, "Subsurface Textile Irrigation (SSTI)—Fact Sheet," bearing an updated date of Jan. 2015, 6 pages.
Hunter Industries Brochure, "ECO-MAT and PLD-ESD: Subsurface Irrigation," bearing a copyright date of 2012, 8 pages.
Hunter Industries, "Drip Irrigation Design & Installation Guide," bearing a copyright date of 2012, 32 pages.
USPTO; U.S. Appl. No. 14/921,484; Office Action mailed Sep. 6, 2016; 12 pages.
Antelco Irrigation Equipment, Take-Off Fittings, Metric Catalogue, 2014, p. 5.4 and 5.5.
USPTO; U.S. Appl. No. 14/921,484; Office Action mailed Jan. 26, 2017; 9 pages.
PCT International Preliminary Report on Patentability of the International Bureau of WIPO for International Application No. PCT/US2015/057160 dated Apr. 25, 2017 (5 pages).
USPTO; Office Action mailed Feb. 2, 2018 for U.S. Appl. No. 14/921,484, 10 pages.
European Patent Office, Partial Supplementary European Search Report for European Patent Application 15851751.6 dated Jun. 1, 2018, 14 pages.
USPTO; U.S. Appl. No. 14/921,484; Office Action mailed Aug. 2, 2018; (pp. 1-11).
European Patent Office, Extended European Search Report for European Patent Application No. 15851751.6 dated Sep. 10, 2018, 12 pages.
Rain Bird Corporation, Landscape Drip/Xerigation 2005-2006 Catalog, p. 271, (catalog illustrates Models XM-TOOL and EMA-RBPX hole punch tools which were on sale or publicly available more than one year prior to the filing date of the instant application).
Rain Bird Corporation, Xerigation 2001 Catalog, p. 199 (catalog illustrates Modeis XM-TOOL and EMA-BGX hole punch tools which were on sale or publicly avaliable more than one year prior to the filing date of the instant application).
USPTO; U.S. Appl. No. 17/077,244; Non-Final Rejection mailed Oct. 29, 2024; (pp. 1-8).

\* cited by examiner

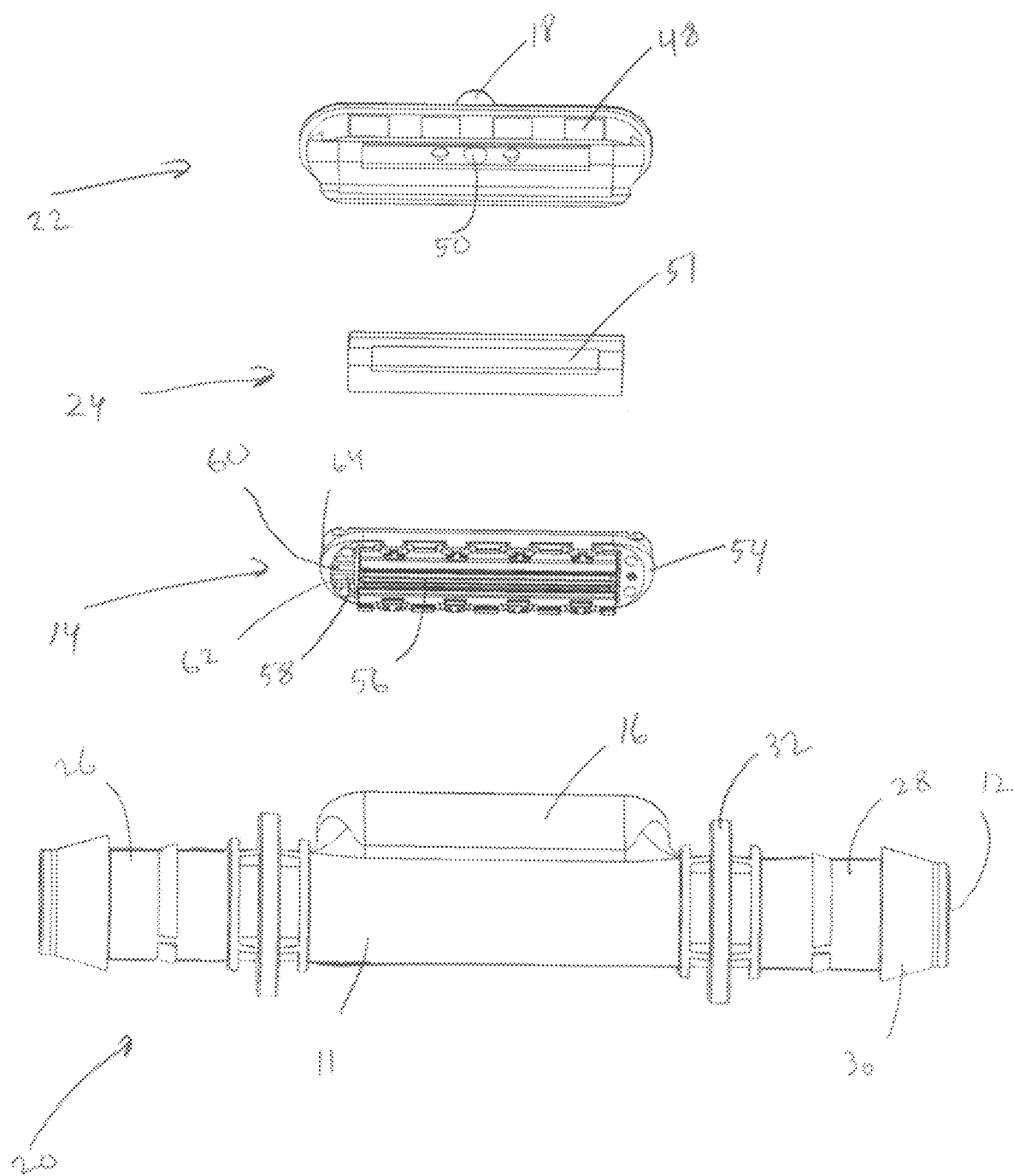

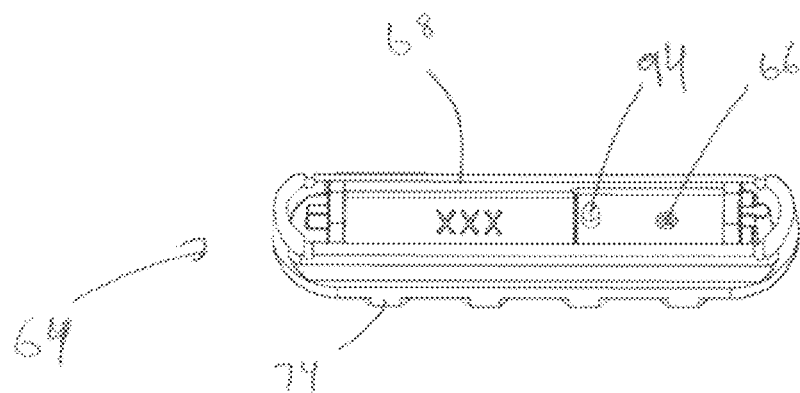
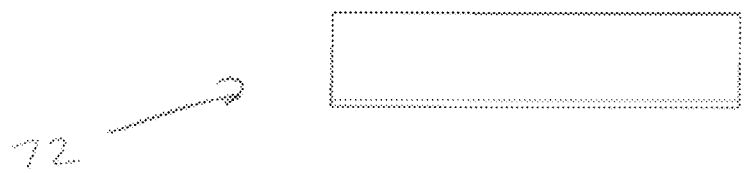
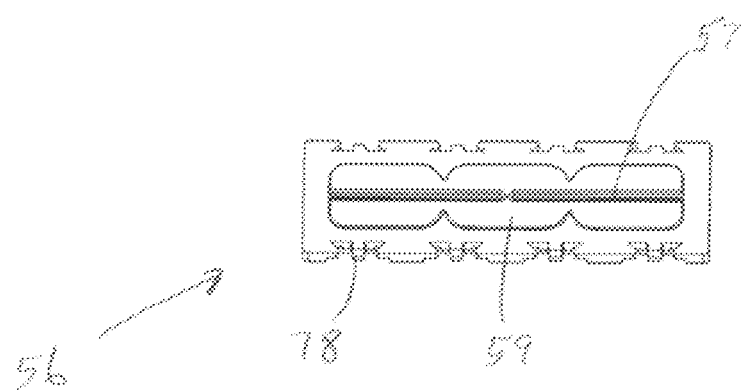

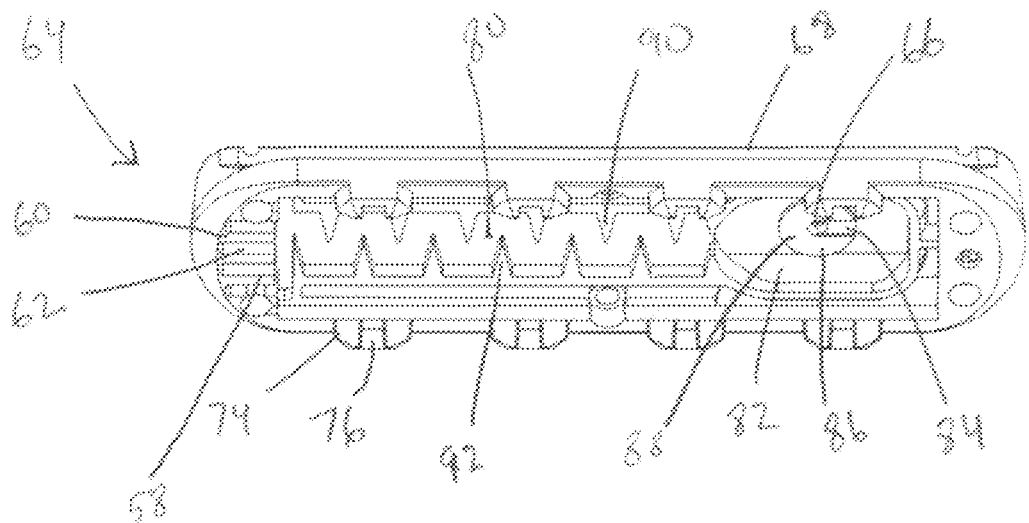
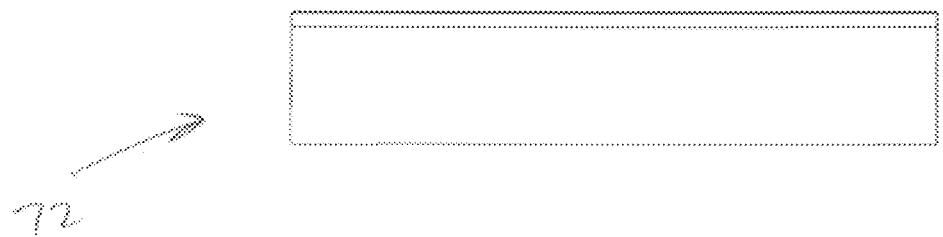
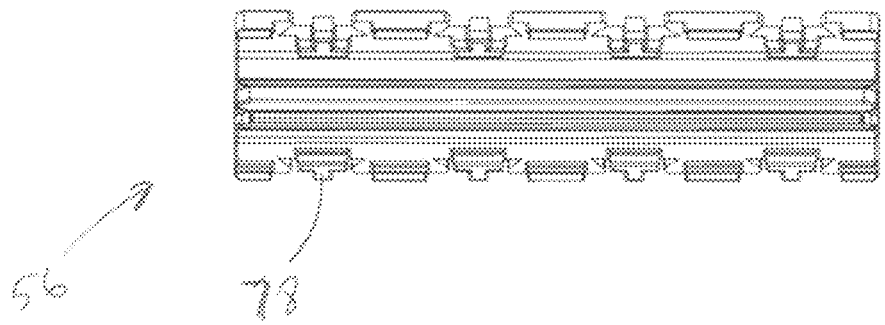
FIG. 10

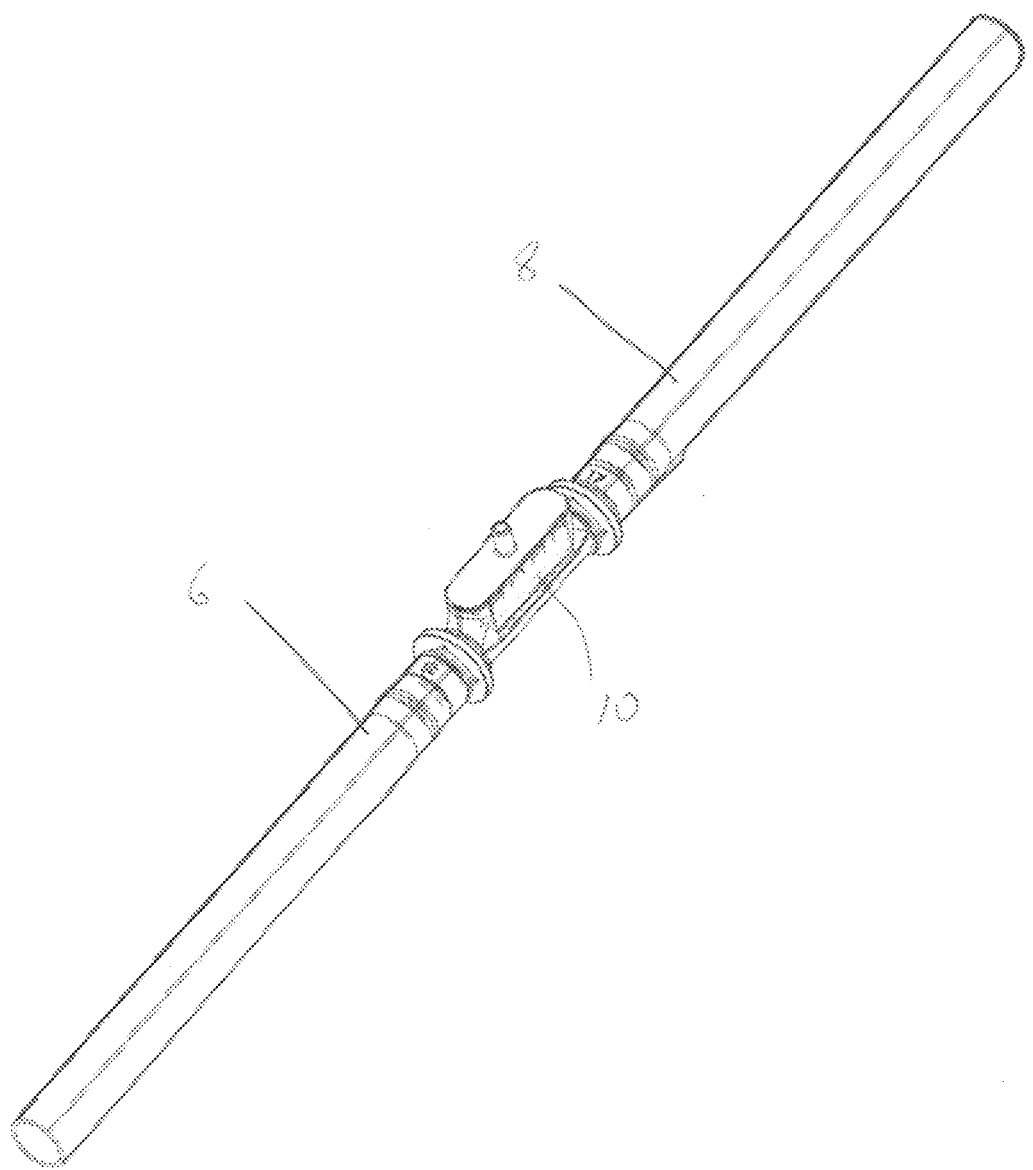

EMITTER COUPLER AND IRRIGATION SYSTEM

FIELD

This invention relates generally to irrigation drip emitters and, more particularly, to irrigation drip emitters used with driplines.

BACKGROUND

Drip emitters are generally known in the field of irrigation for use in delivering irrigation water to a precise point at a predetermined and relatively low volume flow rate, thereby conserving water. Emitters are connected to a water supply tube through which irrigation water is supplied under pressure. The drip emitter taps a portion of the relatively high pressure irrigation water from the supply tube for flow through a flow path to achieve a desired pressure drop prior to discharge at a target trickle or drip flow rate.

In a conventional system, multiple emitters are mounted at selected positions along the length of the dripline to deliver the irrigation water to a large number of specific points, such as directly to a plurality of individual plants. In some forms, emitters are spaced apart at regular intervals along the dripline, which may depend on the desired amount of irrigation. Further, in some forms, emitters, may be mounted at regular intervals on the outside of the dripline ("on-line emitters"), while in other forms, emitters may be mounted at regular intervals within the dripline itself ("in-line emitters"). Each emitter generally includes an inlet to receive water flowing through the dripline, a flow path to reduce water pressure, and an outlet to emit water from the dripline at a specific rate for irrigation.

Emitters mounted to the outside of the dripline often include structure that is used to puncture the supply tube at desired irrigation points. It has been observed over time, however, that emitters may separate from the dripline. As an example, maintenance crews may inadvertently snag these emitters and pull them out of the dripline. Depending on the condition of the dripline, it is often not easy to simply replace or reattach such separated emitters to the dripline without leakage.

For a dripline with emitters mounted within the dripline, it has also been observed over time that some of the emitters may stop functioning. For example, some emitters may become clogged or obstructed with grit or debris that renders them inoperable. As the emitters are disposed within the dripline, it may be difficult to replace these emitters with functional ones.

It is desirable to avoid having to replace an entire dripline based on the failure of a few emitters. Thus, there is a need for a type of emitter where the emitter will have less of a tendency to separate from a supply tube than on-line emitters. Further, there is a need for a type of emitter where the emitter can be readily replaced if it becomes inoperable, such as due to clogging.

BRIEF DESCRIPTION OF THE DRAWINGS

FIG. 8 is a bottom exploded view of the emitter coupler of FIG. 1 (with the emitter not exploded);

FIG. 9 is a top exploded view of the emitter of the emitter coupler of FIG. 1;

FIG. 10 is a bottom exploded view of the emitter of the emitter coupler of FIG. 1;

FIG. 12 is a perspective view of the emitter coupler of FIG. 1 connected to supply tubes.

DESCRIPTION OF THE PREFERRED EMBODIMENTS

Figure 1:
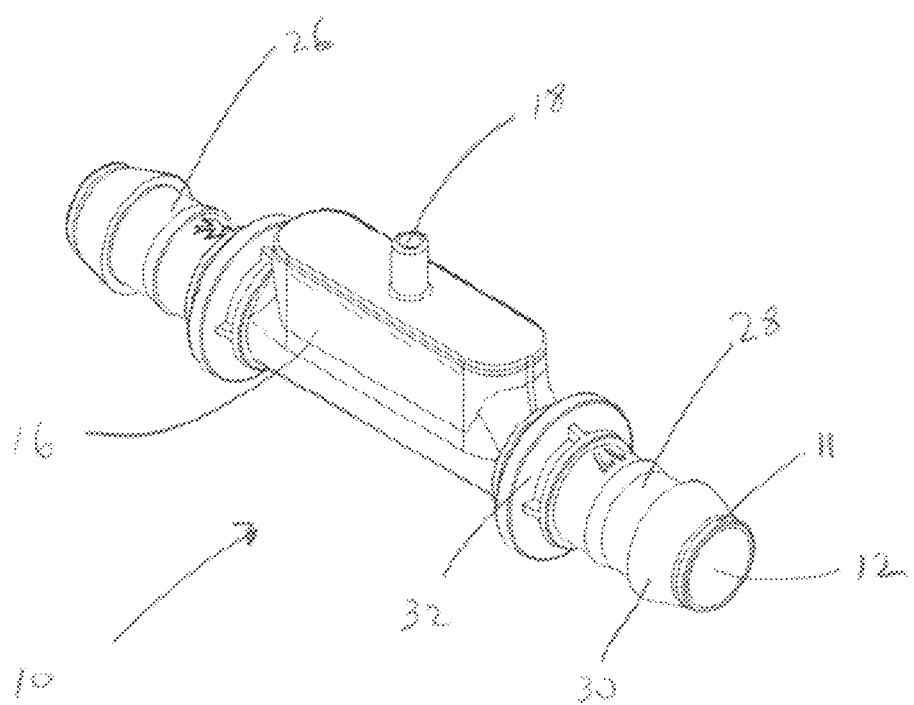
FIG. 1 is a perspective view of an embodiment of an emitter coupler embodying features of the present invention.
Figure 2:
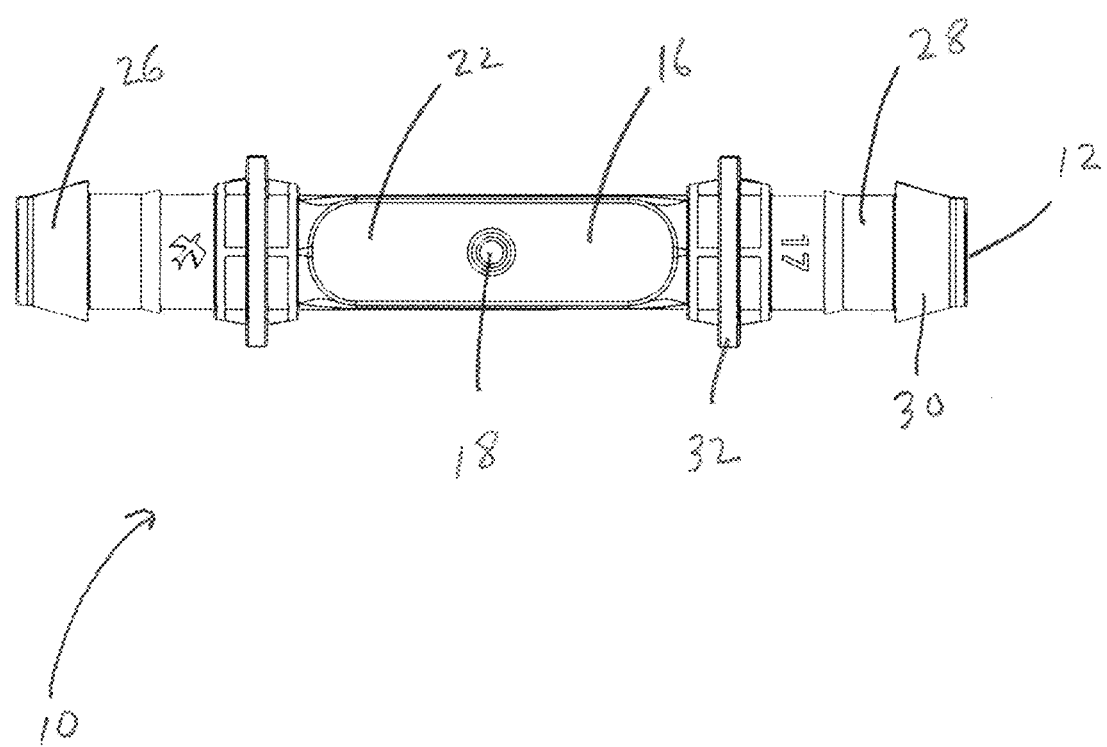
FIG. 2 is a top plan view of the emitter coupler of FIG. 1.
Figure 3:
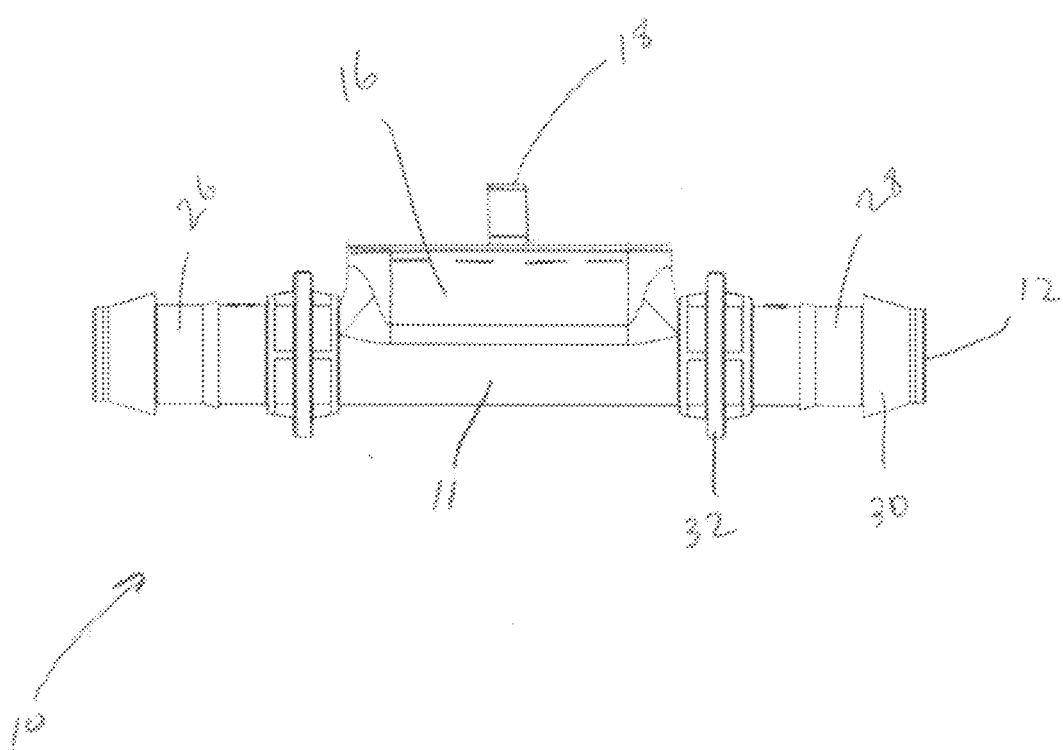
FIG. 3 is a side elevational view of the emitter coupler of FIG. 1.

With respect to FIGS. 1-8, an emitter coupler 10 is shown for use in conjunction with supply tubes to deliver irrigation water or fluid from a water source through the emitter coupler 10. The emitter coupler 10 receives fluid at a relatively high pressure and delivers fluid to surrounding terrain at a reduced trickle, or drip flow, rate. The emitter coupler 10 has a coupling portion at two ends of the emitter coupler 10 to allow the emitter coupler 10 to be connected to two separate supply tubes. FIG. 12 shows an example where an emitter coupler 10 is connected to two supply tubes 6, 8.

In one form, it is generally contemplated that multiple emitter couplers 10 may be connected in series with intervening supply tubes to collectively form an extended dripline. The emitter couplers 10 may be connected to supply tubes of a predetermined length so that the emitter couplers 10 are at predetermined intervals (such as, for example, regularly spaced intervals) along the dripline.

As can be seen from the figures, the emitter coupler 10 is spliced in an in-line position, relative to the supply tubes and dripline. This attachment is in contrast to conventional online emitters, which are generally mounted onto the supply tube. The spliced inline attachment of the emitter couplers 10 provides a more secure installation that helps prevent inadvertent detachment of the emitter couplers 10 from the supply tubes. Also, any emitter couplers 10 that become inoperable, such as due to clogging by grit and debris, can be readily replaced.

As can be seen from FIGS. 1-6, the emitter coupler 10 generally includes a tubular portion 11 defining a conduit 12 (or passage) to allow fluid to flow from one end to the other and to allow fluid to continue its flow through the dripline. This conduit 12 is in fluid communication with an emitter 14, which receives fluid at a relatively high pressure from the conduit 12 and emits it at a reduced pressure. The emitter 14 is contained within a housing 16, or enclosure or carrier, which protects the emitter 14 from external forces that may tend to damage or dislodge it. The emitter coupler 10 further includes an outlet 18 to distribute fluid emitted by the emitter 14 to the terrain about the emitter coupler 10.

Figure 7:
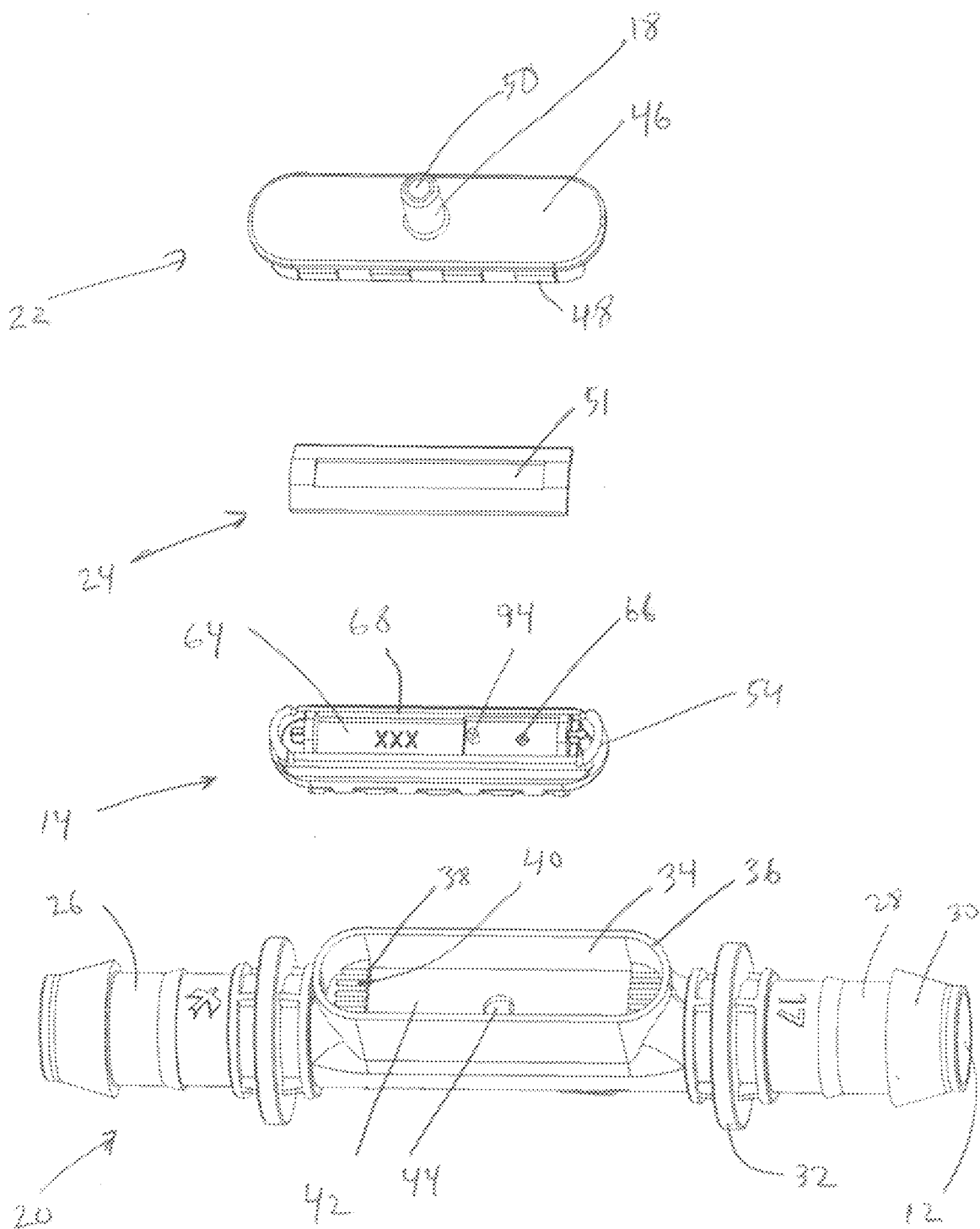
FIG. 7 is a top exploded view of the emitter coupler of FIG. 1 (with the emitter not exploded)

As shown in FIGS. 7 and 8, the emitter 14 preferably includes four components: a coupler body 20, an emitter 14, a coupler cover 22, and a coupler cover gasket 24. The coupler body 20 and coupler cover 22 may be conveniently and economically formed from assembled plastic molded components. The coupler body 20 is adapted for assembly with the coupler cover 22 to form a substantially enclosed housing interior, which encloses the emitter 14.

The coupler body 20 defines the conduit 12 allowing fluid to flow from one end of the emitter coupler 10 to the other end. The coupler body 20 also includes a first coupling portion 26 at one end of the emitter coupler 10 to allow attachment to a first supply tube. The emitter coupler 10 includes a second coupling portion 28 at the second end of the emitter coupler 10 to allow attachment to a second supply tube. As can be seen, in this particular form, each coupling portion 26, 28 includes a frustoconical portion 30 that forms an outer annular barb to help retain the supply tube on the coupling portion 26, 28 and a circular wall 32. Each coupling portion 26, 28 also preferably includes another smaller, inner annular barb to help retain the supply tube on the coupling portion 26, 28. A supply tube may be mounted on the outer surface of each coupling portion 26, 28 and pulled so that an end of the supply tube abuts the circular wall 32. It is generally contemplated that any of various forms of coupling portions, or attachment formations, may be used to securely connect the emitter coupler 10 to supply tubes.

As shown in FIG. 7, the coupler body 20 also includes a housing portion 34 that receives the emitter 14 therein and that generally defines an emitter chamber. In this particular form, the housing portion 34 is generally obround in cross-section and includes a generally obround wall 36, although it should be understood that the housing portion 34 may have any general shape sufficient to receive and enclose a particular type of emitter. In this particular form, the housing portion 34 preferably includes a series of longitudinally extending fins 38 that define grooves 40 therebetween. These fins 38 receive corresponding structure on the emitter 14 to securely seat the emitter 14 within the housing portion 34. As should be understood, alternative structure may be used to receive and seat the emitter 14 within the housing portion 34, and such alternative structure may depend on the specific structure of the emitter being used in the emitter coupler 10. In certain forms, it may be determined that no such receiving structure is necessary, depending on the particular form of emitter.

Figure 4:
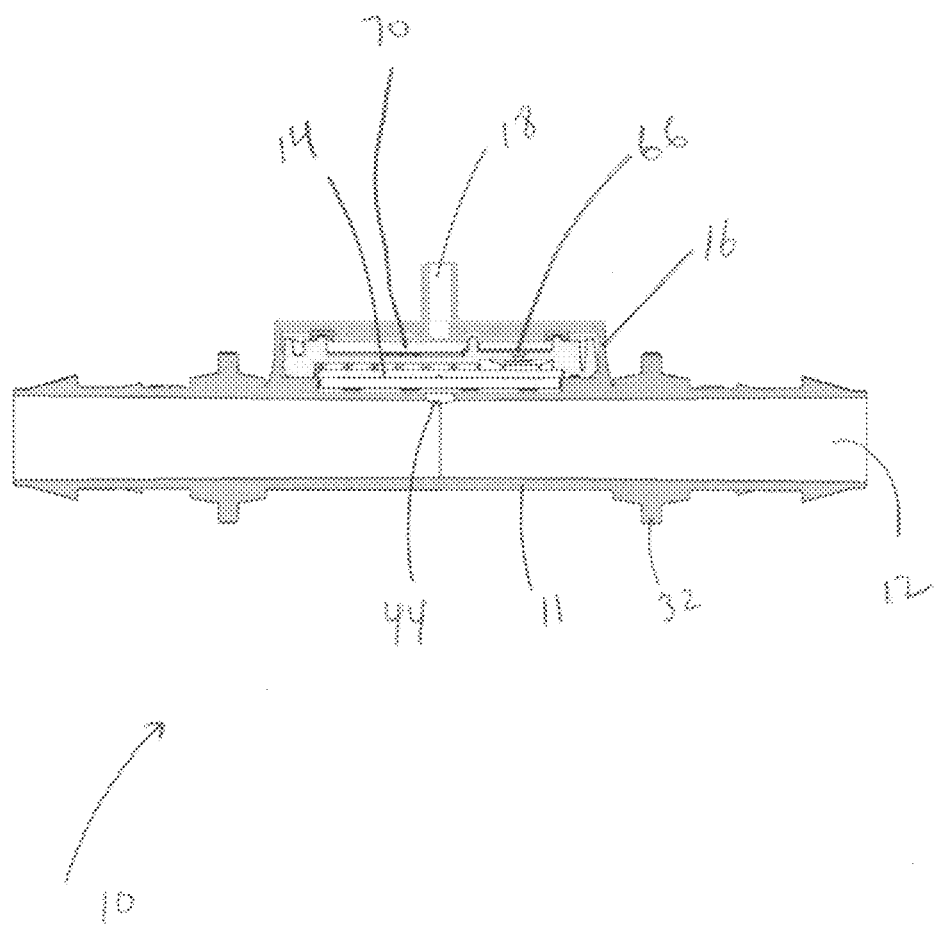
FIG. 4 is a cross-sectional view of the emitter coupler of FIG. 3.
Figure 5:
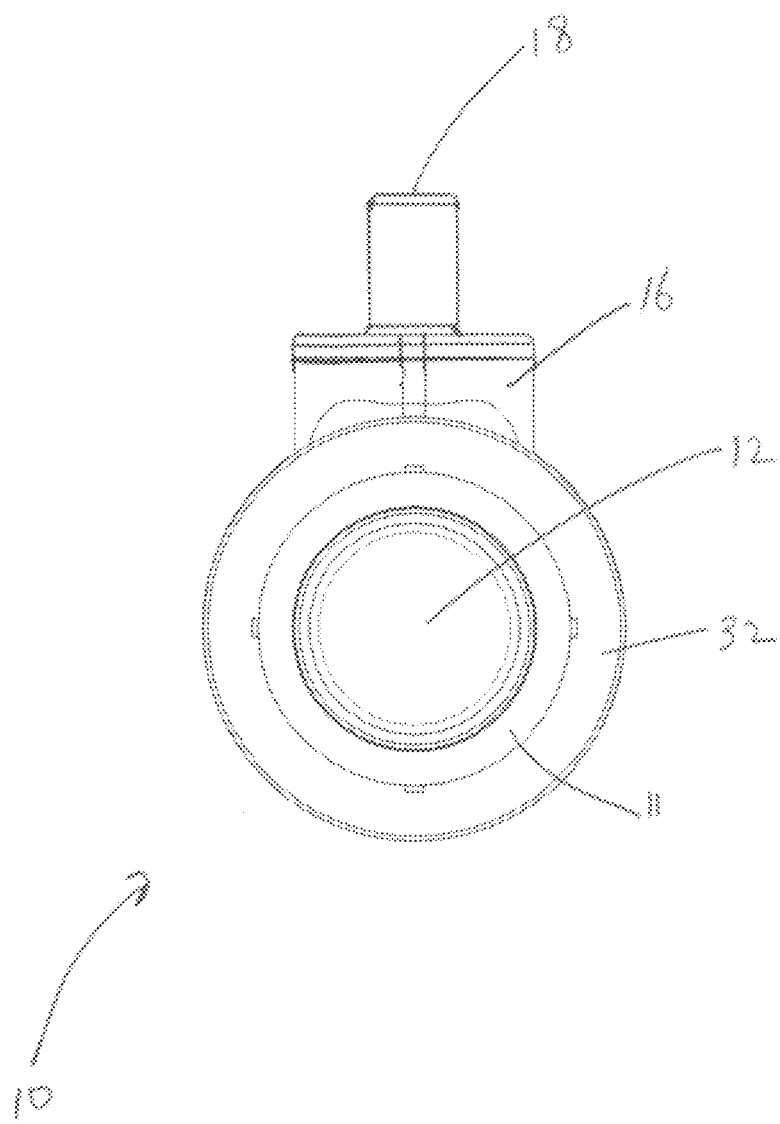
FIG. 5 is a front view of the emitter coupler of FIG. 1.
Figure 6:
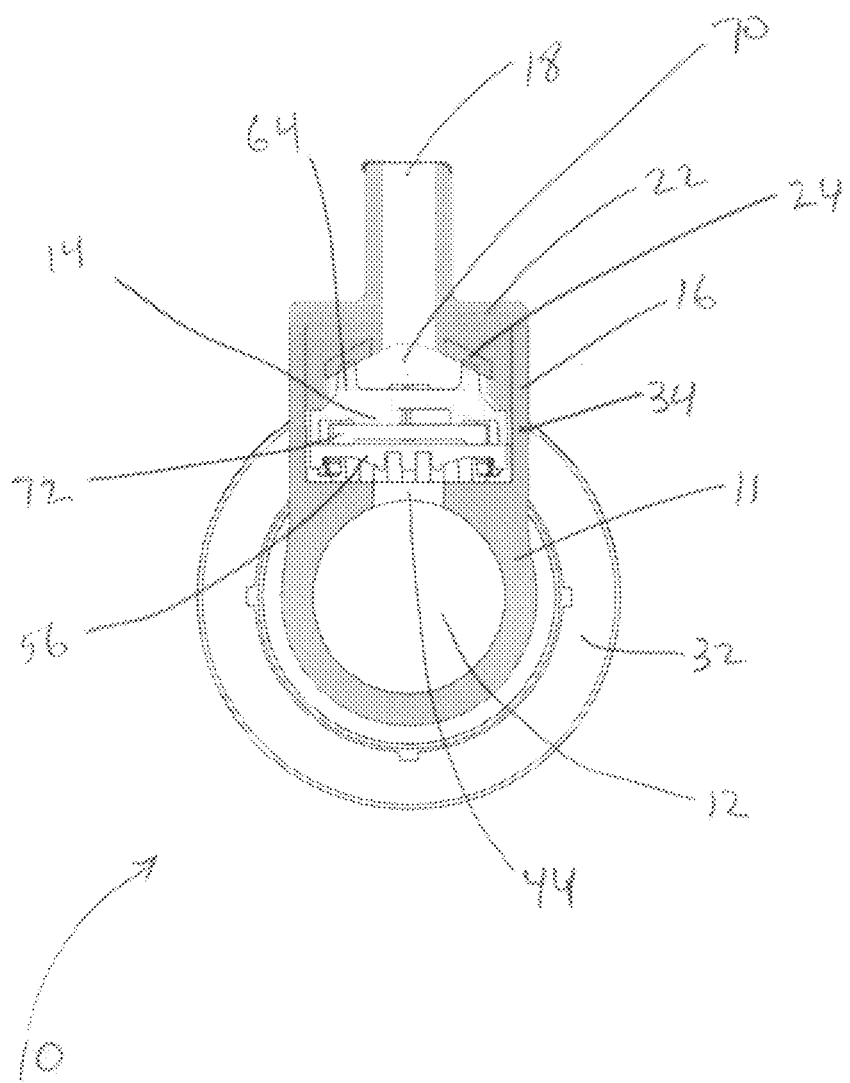
FIG. 6 is a cross-sectional view of the emitter coupler of FIG. 5.

The housing portion 34 preferably includes a floor 42 that supports the emitter 14 thereon and that also separates the housing portion 34 from the conduit 12. As shown in FIGS. 4, 6, and 7, an aperture 44 extends through the floor 42 and tubular portion 11 so that the conduit 12 is in fluid communication with the housing portion 34 and fluid can flow from the conduit 12 and into the housing portion 34. As will be understood, the aperture 44 may be any of various shapes and sizes and may be disposed at different locations along the floor 42.

As shown in FIGS. 7 and 8, the emitter coupler 10 preferably includes a coupler cover 22. The coupler cover 22 is a second housing component, which in combination with the housing portion 34 collectively forms the housing that holds the emitter 14. As can be seen, the coupler cover 22 includes a top surface 46 that is generally obround in cross-section so as to the conform to the shape of the housing portion 34. Any of various sizes and shapes of the coupler cover 22 are possible such that the coupler cover 22 and the housing portion 34 conform to one another and collectively enclose the emitter 14.

The coupler cover 22 preferably includes engagement members 48 for fastening the coupler cover 22 to the housing portion 34 of the coupler body 20. The coupler cover 22 preferably has engagement members in the form of projecting tabs 48 (preferably four projecting tabs) on each side of the coupler cover 22. These projecting tabs 48 increase in thickness as one proceeds towards the top surface 46. When the coupler cover 22 is inserted into the housing portion 34, the projecting tabs 48 are in press fit engagement with the wall 36 of the housing portion 34. As should be understood, other engagement members are possible. Further, the coupler cover 22 may be fastened to the housing portion 34 in a variety of different ways. For instance, adhesive and/or welding may be used in combination with the press fit or alone.

The coupler cover 22 also preferably includes the outlet 18 of the emitter coupler 10. The coupler cover 22 is in fluid communication with the emitter 14 and receives fluid emitted by the emitter 14 at a reduced pressure. In this particular form, the outlet 18 is generally tubular in shape and defines an opening 50 extending through the top surface 46. The outlet 18 may be any of various shapes and sizes.

As shown in FIGS. 6-8, the emitter coupler 10 also preferably includes a gasket or seal 24. The gasket 24 is preferably formed of a flexible material (such as rubber or an elastomeric material) that is shaped to conform to and seal the junction between surfaces of the coupler cover 22 and the emitter 14. More specifically, in this form, it is shaped to conform to the underside of the coupler cover 22 and to engage an external rim surface of the emitter 14. The gasket 24 has a cut-out interior 51 so as to allow fluid to flow from an exit opening of the emitter 14 to the outlet 18 of the emitter coupler 10, as described further below. In one preferred form, the gasket 24 may be generally rectangular in shape and the cut-out interior portion 51 may also be generally rectangular.

Next, as shown in FIGS. 6-11, the emitter coupler 10 includes an emitter 14. It is generally contemplated that any of various types of emitters may be used in the emitter coupler 10. In this regard, some examples of various types of emitters that may be used are described in U.S. Pat. Nos. 7,648,085; 8,302,887; 9,743,594; 10,842,090; all of which are incorporated by reference herein in their entirety. The type of emitter used should generally include an inlet in fluid communication with the conduit 12 and an exit opening in fluid communication with the outlet 18 of the emitter coupler 10. Also, it should be sized to be received and contained within the housing 16.

Figure 11:
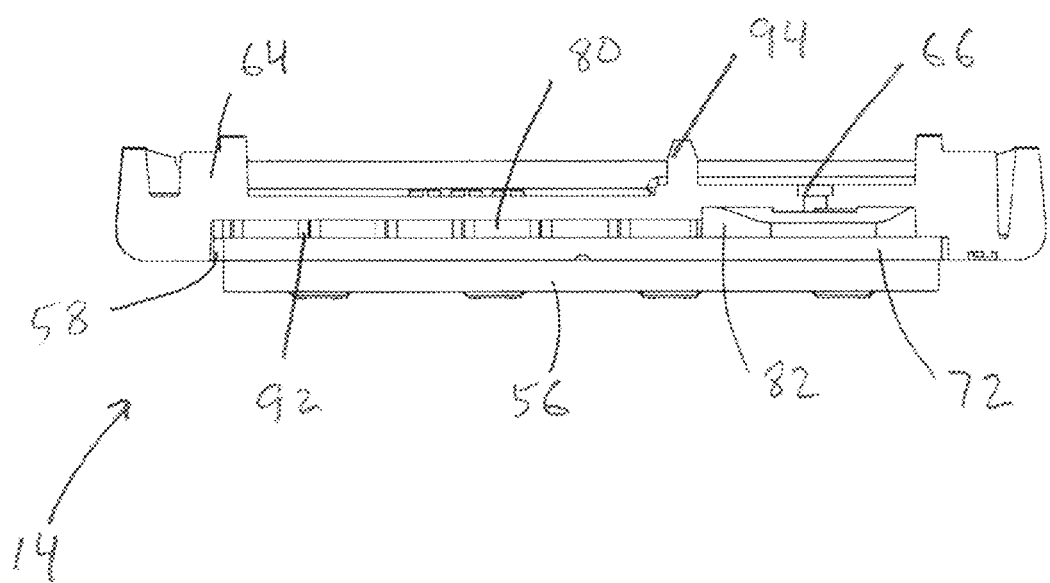
FIG. 11 is a cross-sectional view of the assembled emitter shown in FIGS. 9 and 10.

FIGS. 9-11 illustrate a preferred type of emitter 14, which is similar to emitters described in U.S. Pat. No. 8,302,887. The emitter 14 includes an emitter housing 54, which, in one preferred form, includes two components: an emitter housing base 64 and an emitter cover 56. An inlet 58 is disposed at one end of the emitter 14 for receiving fluid from the conduit 12 via the aperture 44. The emitter housing base 64 includes a series of longitudinally extending fins 60 that define a plurality of grooves 62 at the emitter inlet 58. The fins 60 act to filter out grit and debris that might otherwise clog the emitter 14. These emitter fins 60 are configured to be received by the grooves 40 of the housing portion 34 described above. The emitter 14 and the housing portion 34 are sized and configured to define the inlet 58 and to allow fluid to flow into the emitter 14 via the inlet 58. However, it should be understood that the structure of the inlet 58 may include any design of opening or openings in the emitter housing 54, such as various numbers and arrangements of fins, grooves, and holes that allow access to the interior of the housing 54 and may be located at various points on the emitter housing 54.

The emitter housing base 64 defines an emitter outlet 66 (or exit opening) at the opposite end of the emitter 14 as the inlet 58. The base 64 also preferably includes a raised rim 68 extending about its perimeter. The raised rim 68 engages the gasket 24 described above, which, in turn, engages the underside surface of the coupler cover 22. The raised rim 68 forms a gap between the surface of the housing base 64 inside the raised rim 68 and the underside surface of the coupler cover 22. The gap forms an outlet bath 70, which allows fluid to flow from the emitter outlet 66 out through the outlet 18 of the emitter coupler 10. In other words, water exiting the emitter 14 through the emitter outlet 66 flows into the outlet bath 70 and trickles out to the terrain to be irrigated through the outlet 18.

As can be seen from FIGS. 9-11, the emitter cover 56 and the housing base 64 are adapted for easy assembly and define a housing interior. A diaphragm 72 (which, in one preferred form, is generally rectangular in shape) is disposed in the housing interior between the emitter cover 56 and the housing base 64. The emitter cover 56 and the housing base 64 may be plastic molded components.

In one preferred form, a plurality of arms 74 extend from the perimeter of the longitudinal sides of the housing base 64. The arms 74 define slots 76 for interlocking engagement with complementarily shaped tabs 78 disposed along the perimeter of the emitter cover 56. The emitter cover 56 and the housing base 64 engage one another, preferably by heat bonding, to cause the diaphragm 72 to sealingly engage the interior of the housing base 64. As should be evident, numerous other structures and attachment methods may be used to couple the emitter cover 56 and the housing base 64 together and to seal the diaphragm 72 therebetween.

As shown in FIGS. 10 and 11, the interior surface of the housing base 64 and the diaphragm 72 define an internal flow path through the emitter 14 from the inlet 58 to the emitter outlet 66. The diaphragm 72 is preferably an elongated strip dimensioned to overlap and seal against the flow path and is preferably an elastomeric, silicone, or rubber material. Alternatively, the diaphragm 72 may be other shapes, such as, for example, arcuate in shape, to accommodate alternative embodiments of the drip emitter having curved, circular, and/or three-dimensional flow paths.

The housing base 64 defines a pressure reducing flow channel 80 and a water metering chamber 82. More specifically, water flows from the inlet 58, through the pressure reducing flow channel 80, and into the water metering chamber 82. It then flows through a groove 84, defined by a water metering surface 86 on the bottom of the water metering chamber 82, to the emitter outlet 66. Water flowing through this flow path experiences a pressure drop.

As shown in FIG. 9, the interior surface of the housing cover 56 defines an elongated, central channel 57 forming a pressure chamber between the housing cover 56 and the diaphragm 72. The interior surface of the housing cover 56 does not have a complete sealing engagement with the diaphragm 72, so that water therefore enters and accumulates in the central channel 57 through a gap between the housing cover 56 and the diaphragm 72 at the inlet and outlet ends. The water in this channel 57 does not flow into and through the emitter 14.

The interior surface of the housing cover 56 preferably includes a generally central raised region 59 which engages the diaphragm 72. The raised region 59 defines the channel 57, which extends centrally through this raised region 59. Water accumulating in the channel 57 presses down against the diaphragm 72, thereby flexing and deflecting the diaphragm 72 toward and against the water metering surface 86.

The water metering surface 86 includes a raised circular portion, or island 88, with the groove 84 providing a flow path across the island 88 to the emitter outlet 66. During normal operation, the diaphragm 72 deflects into the groove 84 in response to fluctuations in pressure. This deflection into the groove 84 compensates for such pressure fluctuations and maintains a relatively constant drip flow rate. This pressure differential also improves a self-flushing ability of the emitter 14.

With reference to FIG. 10, the pressure reducing flow channel 80 provides a zigzagging tortuous path for the water flow to reduce the pressure of the water. The channel 80 is preferably defined by a first set of baffles 90 and second set of baffles 92 opposing the first set 90. In one preferred form, a central, elongated portion of preferably substantially rectangular cross-sectional shape extends directly through and between the baffles sets without any directional changes. The central portion divides the pressure reducing flow channel 80 into two sets of laterally extending flow recesses defined by the first set of baffles 90 and the second set of baffles 92, respectively.

The general flow path of fluid flowing through the emitter coupler 10 is described as follows. Fluid flows from a supply tube and enters the conduit 12 at one end of the emitter coupler 10. It then flows from the conduit 12 into the housing portion 34 through the aperture 44. Once in the housing portion 34, fluid enters the emitter 14 through the emitter inlet 58. It then flows through the tortuous channel 80, which reduces the pressure of the fluid, and then flows into the water metering chamber 82 and exits the emitter 14 through the emitter outlet 66. Once fluid exits the emitter 14, it enters the outlet bath 70, which is generally defined by the raised rim 68, of the emitter 14, the gasket 24, and the underside surface of the coupler cover 22. Fluid then exits the emitter coupler 10 through the outlet 18.

In one form, it is generally contemplated that a copper member may be disposed in the outlet bath 70 to prevent plant root intrusion. The interaction between copper and plant roots may be used to protect the emitter 14 from root intrusion and obstruction of the emitter outlet 66. A copper member may be located in front of the emitter outlet 66 in order to inhibit root growth into the outlet 66. The amount of copper that is taken up by plant roots is infinitesimal, and therefore, the life of the copper member is extremely long.

One preferred form of a copper member is a thin rectangular copper plate. For example, the copper plate may be compression fitted to the base 64 of the emitter 14, such that the base 64 holds the copper plate in place. The copper plate may include a first hole for mounting the copper plate to a locator peg 94 protruding from the base 64 of the emitter 10 to provide an additional mounting for the plate. The copper plate may include a second hole that is situated over the emitter outlet 66 so as not to block the emitter outlet 66. The copper plate may be mounted to the base 64 of the emitter 14 in various ways, i.e., the copper plate can be heat staked, glued, co-molded, or otherwise mounted to the base 64. Alternatively, part or all of the base 64 may be flashed with a thin protective copper layer about the emitter outlet 22. Various examples of copper used with an emitter are described in U.S. Pat. No. 7,648,085, which is incorporated herein by reference in its entirety.

It is generally contemplated that the emitter coupler 10 may be used in various types of driplines, including driplines intended for above ground use and driplines intended for subsurface use. In one form, the entire dripline may include emitter couplers 10 spaced at intervals and separated from one another by supply tubes. It is also contemplated that emitter couplers 10 may be used individually to repair missing or inoperable online or inline emitters. For example, an online emitter may be missing from a dripline, and a portion of the dripline may be cut at that location to replace the online emitter with an emitter coupler 10. Similarly, as another example, an inline emitter may be inoperable or non-functional, and the dripline may be cut at the location to replace the inline emitter with an emitter coupler 10.

In one preferred form, an irrigation system is formed that includes a dripline having an interior which is capable of supplying fluid and with multiple emitters at predetermined distances along the dripline. Further, in this preferred form, it is contemplated that each emitter will be part of an emitter coupler. So, in other words, in this form, the dripline will include, and be formed by, supply tubing connected to and alternating with emitter couplers. In this form, the dripline may not include any in-line emitters or on-line emitters.

It will be understood that various changes in the details, materials, and arrangements of parts and components which have been herein described and illustrated in order to explain the nature of the emitter coupler may be made by those skilled in the art within the principle and scope of the emitter coupler as expressed in the appended claims. Furthermore, while various features have been described with regard to a particular embodiment or a particular approach, it will be appreciated that features described for one embodiment also may be incorporated with the other described embodiments.

What is claimed is:

1. An emitter coupler comprising:
    a body configured for coupling to two supply tubes, the body comprising a first coupling portion and a second coupling portion;
    a passage defined by the body to receive pressurized fluid;
    the body defining an emitter chamber;
    a cover over the emitter chamber; and
    an emitter disposed in the emitter chamber, the emitter comprising:
        an emitter inlet in fluid communication with the passage; and
        an emitter outlet downstream of the emitter inlet, the emitter inlet receiving fluid at a first pressure and the emitter outlet emitting fluid at a second, reduced pressure.

2. The emitter coupler of claim 1, wherein each of the first coupling portion and the second coupling portion includes an outer surface configured to grip the supply tube for sealingly mounting the supply tube thereto.

3. The emitter coupler of claim 2, wherein the outer surface includes at least one annular barb.

4. The emitter coupler of claim 2, wherein the outer surface includes at least two annular barbs.

5. The emitter coupler of claim 1, further comprising a gasket disposed between the emitter and the cover.

6. The emitter coupler of claim 1, wherein the emitter chamber comprises a floor including an aperture allowing fluid to flow from the passage into the emitter chamber.

7. The emitter coupler of claim 1, further comprising an outlet bath defined by the emitter and the cover, the outlet bath providing a flow path from the emitter outlet to an outlet of the emitter coupler.

8. The emitter coupler of claim 7, further comprising a gasket disposed between the emitter and the cover, the cover defining the outlet of the emitter coupler and the outlet bath being defined by the emitter, the gasket, and the cover.

9. The emitter coupler of claim 7, further comprising copper disposed in the outlet bath at the emitter outlet.

10. The emitter coupler of claim 7, further comprising a mount for affixing a copper member in the outlet bath.

11. The emitter coupler of claim 1, wherein the emitter comprises an emitter housing defining the emitter inlet and the emitter outlet and a diaphragm disposed within the emitter housing.

12. The emitter coupler of claim 11, wherein the emitter housing defines in part a pressure reducing flow channel with a set of baffles.

13. An irrigation system comprising:
    a dripline having an interior which is capable of supplying fluid;
    a plurality of emitters at predetermined distances along the dripline;
    at least one emitter coupler forming part of the dripline, the at least one emitter coupler comprising:
        a body configured for coupling to two supply tubes, the body comprising a first coupling portion and a second coupling portion;
        a passage defined by the body to receive pressurized fluid;
        the body defining an emitter chamber;
        a cover over the emitter chamber; and
        an emitter of the plurality of emitters being disposed in the emitter chamber, the emitter comprising:
            an emitter inlet in fluid communication with the passage; and
            an emitter outlet downstream of the emitter inlet, the emitter inlet receiving fluid at a first pressure and the emitter outlet emitting fluid at a second, reduced pressure.

14. The irrigation system of claim 13, wherein the cover defines an outlet of the at least one emitter coupler.

15. The irrigation system of claim 13 wherein the emitter chamber of the at least one emitter coupler comprises a floor including an aperture allowing fluid to flow from the passage into the emitter chamber.

16. The irrigation system of claim 13, further comprising an outlet bath in the at least one emitter coupler defined by the emitter and the cover, the outlet bath providing a flow path from the emitter outlet to an outlet of the at least one emitter coupler.

17. The irrigation system of claim 16, wherein the at least one emitter coupler comprises:
    a gasket disposed between the emitter and the cover, the cover defining the outlet of the at least one emitter coupler; and
    the outlet bath being defined by the emitter, the gasket, and the cover.

18. The irrigation system of claim 16, further comprising copper disposed in the outlet bath at the emitter outlet of the at least one emitter coupler.

19. The irrigation system of claim 13, wherein each of the first coupling portion and the second coupling portion includes an outer surface configured to grip supply tubing.

20. The irrigation system of claim 19, wherein the outer surface includes at least one annular barb.

21. The irrigation system of claim 13, wherein the at least one emitter coupler is a plurality of emitter couplers forming part of the dripline, each of the plurality of emitter couplers being at predetermined distances along the dripline.

* * * * *